(12) United States Patent
Jeong et al.

(10) Patent No.: US 10,922,315 B2
(45) Date of Patent: Feb. 16, 2021

(54) UNIFIED OPTIMIZATION OF ITERATIVE ANALYTICAL QUERY PROCESSING

(71) Applicant: SAP SE, Walldorf (DE)

(72) Inventors: Chanho Jeong, Seoul (KR); Sung Yeol Lee, Seoul (KR); Chungmin Lee, Seoul (KR)

(73) Assignee: SAP SE

( * ) Notice: Subject to any disclaimer, the term of this patent is extended or adjusted under 35 U.S.C. 154(b) by 218 days.

(21) Appl. No.: 15/988,862

(22) Filed: May 24, 2018

(65) Prior Publication Data

US 2019/0362007 A1    Nov. 28, 2019

(51) Int. Cl.
    G06F 16/2453    (2019.01)

(52) U.S. Cl.
    CPC .............................. G06F 16/24545 (2019.01)

(58) Field of Classification Search
    None
    See application file for complete search history.

(56) References Cited

U.S. PATENT DOCUMENTS

| 6,026,240 | A | 2/2000 | Subramanian | |
|---|---|---|---|---|
| 2008/0010240 | A1 | 1/2008 | Zait | |
| 2018/0329952 | A1* | 11/2018 | Ramachandra | G06F 16/284 |
| 2018/0373510 | A1* | 12/2018 | Chung | G06F 8/48 |

OTHER PUBLICATIONS

Extended European Search Report, dated Sep. 5, 2019, for corresponding European Patent Application No. 19175959.6, 10 pages.
"Query Optimization," *Wikipedia*, www.wikipedia.org, visited May 4, 2018, 5 pages.
"Correctness (computer science)," www.wikipedia.org, visited May 4, 2018, 2 pages.
"Iteration," www.wikipedia.org, visited May 4, 2018, 3 pages.
"Declarative Programming," www.wikipedia.org, visited May 4, 2018, 4 pages.
"Dependency Graph," www.wikipedia.org, visited May 17, 2018, 3 pages.

(Continued)

*Primary Examiner* — Giuseppi Giuliani
(74) *Attorney, Agent, or Firm* — Klarquist Sparkman, LLP

(57) ABSTRACT

Optimization of procedures for enterprise applications can take both declarative query statements and imperative logic into account in a unified optimization technique. An input procedure can implement complex analytical queries and also include iterative control flow logic such as loops. Alternative query execution plans for the procedure can be enumerated by moving queries out of and into loop boundaries via hoist and sink operations. Program correctness can be preserved via excluding some operations via dependency graphs. Sink subgraphs can also be used. Query inlining can also be supported, resulting in synergies that produce superior execution plans. The computing execution resource demand of the respective alternatives can be considered to arrive at an optimal query execution plan that can then be used to actually implement execution of the procedure. Execution performance can thus be greatly improved by performing counterintuitive optimizations.

20 Claims, 28 Drawing Sheets

(56) References Cited

OTHER PUBLICATIONS

"Dependency Graph," SAP Blogs, https://blogs.sap.com/2014/08/22/dependency-graph/, Aug. 22, 2014, 18 pages.
"TPC™," http://www.tpc.org/tpcds/ © 2001-2018, visited May 17, 2018, 1 page.
Aho et al., Compilers, Principles, Techniques, <§ Tools, Second Edition, *Pearson Addison Wesley*, © 2007, 1038 pages.
Barnston, "Correspondence among the Correlation, RMSE, and Heidke Forecast Verification Measures; Refinement of the Heidke Score," *Notes and Correspondence*, Dec. 1992, pp. 699-709.
Binnig et al., "SQLScript: Efficiently Analyzing Big Enterprise Data in SAP HANA," 2013, 20 pages.
Chaudhuri et al., "Random Sampling for Histogram Construction: How much is enough?" *AMC SIGMOD Record*, vol. 27, pp. 436-447, 1998.
Cheung et al., "Inferring SQL Queries Using Program Synthesis," arXiv preprint arXiv:1208.2013, 2012, 12 pages.
Cytron et al., "Efficiently Computing Static Single Assignment From and the Control Dependence Graph," *ACM Transactions on Programming Languages and Systems*, vol. 13, No. 4, Oct. 1991, pp. 451-490.
De Alba et al., "Path-based Hardware Loop Prediction," In $4^{th}$ *International Conference on Control, Virtual Instrumentation and Digital Systems*, 2002, 10 pages.
De Alba, "Runtime Predictability of Loops," In *Workload Characterization, 2001, WWC-4, IEEE International Workshop on*, IEEE, 2001, pp. 91-98.
Diaconu et al., "Hekaton: SQL Server's Memory-Optimized OLTP Engine," In Proceedings on the 2013 *ACM SIGOMD International Conference on Management of Data*, ACM, 2013, pp. 1243-1254.
El-Helw et al., "Optimization of Common Table Expressions in MPP Database Systems," *Proceedings of the VLDB Endowment*, vol. 8, No. 12 © 2015, pp. 1704-1715.
Emani et al., "Extracting Equivalent SQL from Imperative Code in Database Applications," *In Proceedings of the 2016 International Conference on Management of Data*, ACM, 2016, pp. 1781-1796.
Galindo-Legaria et al., "Orthogonal Optimization of Subqueries and Aggregation," *In ACM SIGMOD Record*, vol. 30, ACM, 2001, pp. 571-581.
Grosser, "Enabling Polyhedral Optimizations in LLVM," *In Proceedings of the First International Workshop on Polyhedral Compilation Techniques (IMPACT)*, vol. 2011, 2011, 101 pages.
Guravannavar et al., "Rewriting Procedures for Batched Bindings," *Proceedings of the VLDB Endowment* 1(1): 2008, pp. 1107-1123.
Klonatos et al., "Building Efficient Query Engines in a High-Level Language," *Proceedings of the VLDB Endowment*, 7(10), 2014, pp. 853-864.
Lattner et al., "LLVM: A Compilation Framework for Lifelong Program Analysis & Transformation," *In Proceedings of the International Symposium on Code Generation and Optimization: Feedback-Directed and Runtime Optimization*, IEEE, Computer Society, 2004, 11 pages.
Lieuwen et al., A Transformation-Based Approach to Optimizing Loops in Database Programming Languages, *ACM SIGMOD*, 1992, pp. 91-100.
Meehan et al., "S-Store: Streaming Meets Transaction Processing," *Proceedings of the VLDB Endowment*, 8(13), 2015, pp. 2134-2145.
Neumann, "Efficiently Compiling Efficient Query Plans for Modern Hardware," *Proceedings of the VLDB Endowment* 4(19), 2011, pp. 539-550.
Onizuka et al., "Optimization for Iterative Queries on MapReduce," *Proceedings of the VLDB Endowment*, 7(4), 2013, pp. 241-252.
Ramachandra et al., "Program Analysis and Transformation for Holistic Optimization of Database Applications," *In Proceedings of the ACM SIGPLAN International Workshop on State of the Art in Java Program Analysis*, ACM, 2012, pp. 39-44.
Ramachandra et al., "Froid: Optimization of Imperative Programs in a Relational Database," *Proceedings of the VLDB Endowment*, 11(4), 2017, pp. 432-444.
Shaikhha et al., "How to Architect a Query Compiler," *In Proceedings of the 2016 International Conference on Management of Data*, ACM, 2016, pp. 1907-1922.
TPC Benchmark™ DS, Version 2.1.0, Nov. 2015, 135 pages.
Yan et al., "gSpan: Graph-Based Substructure Pattern Mining," *In Data Mining, 2002, ICDM 2003. Proceedings. 2002 IEEE International Conference on*, IEEE, 2002, pp. 721-724.

\* cited by examiner

2600

US 10,922,315 B2

UNIFIED OPTIMIZATION OF ITERATIVE ANALYTICAL QUERY PROCESSING

FIELD

The present disclosure generally relates to database processing, and more particularly to optimizing procedures with query statements in iterative scenarios.

BACKGROUND

A variety of optimization strategies have been used to optimize queries. For example, it is known to generate an optimized plan for an SQL query and using a variety of techniques, including taking advantage of indexes, JOIN ordering, and the like.

Similarly, it is known to optimize imperative computing logic. For example, imperative logic can be organized into basic blocks and various optimizations can be performed based on control flow, data dependencies, and the like.

However, due to the increasing demand placed on computing resources, there remains a need for better optimization strategies that go beyond what is currently available in the field.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment, a computer-implemented method comprises receiving an intermediate representation of an input procedure comprising a plurality of statements, wherein the plurality of statements comprises a plurality of query statements, and a plurality of imperative statements comprising a loop; enumerating a plurality of execution plan candidates for the input procedure via the intermediate representation of the input procedure, wherein the enumerating comprises performing at least one sink operation on a query statement, wherein the sink operation moves the query statement inside a loop boundary; performing query inlining that combines at least two query statements; estimating computing execution resource demands for respective of the execution plan candidates; and determining an optimal execution plan for the input procedure, wherein the determining comprises finding a candidate execution plan having a lowest estimated computing execution resource demand.

In another embodiment, a computing system comprises one or more memories; one or more processing units coupled to the one or more memories; and one or more non-transitory computer readable storage media storing instructions that, when executed, cause the one or more processing units to perform the following operations: receiving an intermediate representation of an input procedure comprising a plurality of statements, wherein the plurality of statements comprises a plurality of query statements, and a plurality of imperative statements comprising a loop; enumerating a plurality of execution plan candidates for the input procedure via the intermediate representation of the input procedure, wherein the enumerating comprises performing at least one sink operation on a query statement, wherein the sink operation moves the query statement inside a loop boundary; performing query inlining that combines at least two query statements; estimating computing execution resource demands for respective of the execution plan candidates; and determining an optimal execution plan for the input procedure, wherein the determining comprises finding a candidate execution plan having a lowest estimated computing execution resource demand.

In another embodiment, one or more non-transitory computer-readable storage media store computer-executable instructions that, when executed by a computing system, cause the computing system to perform a method comprising receiving an intermediate representation graph depicting a computer-implemented procedure comprising a plurality of statements, wherein at least one of the plurality of statements has data dependency on another statement among the plurality of statements, and wherein the procedure further comprises a loop; identifying a first statement among the plurality of statements that is within a boundary of the loop that can be moved outside of the loop boundary; hoisting the first statement outside of the loop boundary; generating an initial execution plan reflecting the hoisting; identifying a second statement among the plurality of statements that is outside the loop boundary that can be moved inside the loop boundary; sinking the second statement inside the loop boundary; generating an alternative execution plan reflecting the sinking; inlining at least one query statement into another query statement; estimating computing execution resource demand of the initial execution plan and the alternative execution plan; determining an optimal execution plan based on estimated computing execution resource demand, wherein the determining comprises comparing estimated computing execution resource demand of the initial execution plan and estimated computing execution resource demand of the alternative execution plan; and selecting the optimal execution plan for execution.

The foregoing and other objects, features, and advantages of the invention will become more apparent from the following detailed description, which proceeds with reference to the accompanying figures.

DETAILED DESCRIPTION

Example 1—Overview

A novel optimization strategy takes both query statements and imperative constructs (e.g., iterative structures such as loops) in which such query statements may appear into account. An input procedure can include both query statements and a loop. A variety of different query execution plans can be enumerated for the input procedure, which is typically represented using an intermediate representation.

One described enumeration strategy is to implement hoist and/or sink operations to relocate where within the intermediate representation the query statements reside. In other words, the query statements are moved within the procedure to the extent possible while preserving procedure correctness.

A data dependency graph can be used to determine whether statements can be hoisted or sinked out of and/or into loops of the procedure. A sink subgraph can be used to indicate the extent to which sinks can be performed on statements represented in the subgraph.

Query inlining can be performed (e.g., as a result of having sinked a query statement proximate to another query statement), resulting in overall improved computing performance. Such inlining can be automated as described herein.

The computing execution resource demand for a particular enumerated query execution plan can be estimated, and compared with the demand of other alternative plans, and a best plan can be selected for subsequent use.

Although it may seem counterintuitive, performance can actually be increased by moving some query statements into a loop. Therefore, combining the query optimization with imperative optimization (e.g., placing a query statement into a particular iterative construct such as a loop) can result in newly-found optimizations (e.g., via inlining the statement that has been sinked into the loop). Experimental results indicate that such a strategy can result in surprising performance gains in particular computing scenarios.

Example 2—Example Overall System Implementing Unified Optimization

Figure 1:
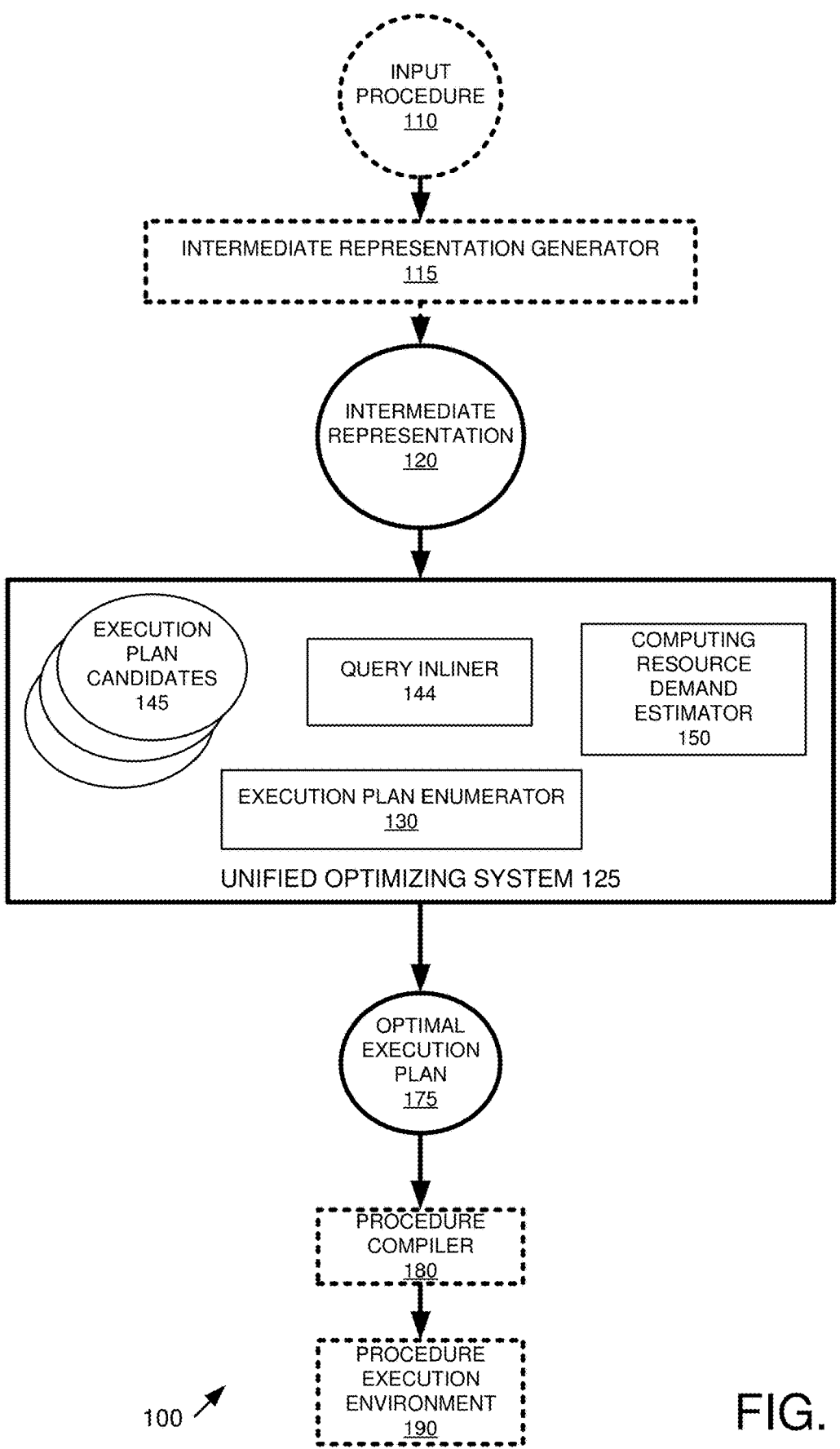
FIG. 1 is a block diagram of an example system implementing optimization of a procedure having both query statements and imperative statements.

FIG. 1 is a block diagram of an example system 100 implementing unified optimization of a procedure having both query statements and imperative statements. In the example, the system 100 can include an input procedure 110 that is processed by an intermediate representation generator 115 into an intermediate representation 120 of the input procedure 110.

A unified optimizing system 125 can receive the intermediate representation 120 and process it with an execution plan enumerator 130 to perform hoist and sink operations and a query inliner 144, as further described herein, to enumerate one or more execution plan candidates 145.

Computing execution resource demand of the enumerated execution plan candidates 145 can be estimated with a computing execution resource demand estimator 150. In practice, demand for an entire candidate or partial estimations for individual operations can be estimated.

The system chooses an optimal execution plan 175 from among the enumerated execution plan candidates 145. The optimal execution plan can then be passed to a procedure compiler 180, and the resulting executable code can then be executed in a procedure execution environment 190.

In any of the examples herein, although some of the subsystems are shown in a single box, in practice, they can be implemented as computing systems having more than one device. Boundaries between the components can be varied. For example, although the computing system 110 is shown as a single entity, it can be implemented by a plurality of devices.

In practice, the systems shown herein, such as system 100, can vary in complexity, with additional functionality, more complex components, and the like. For example, there can be additional functionality within the optimizing system 100. Additional components can be included to implement security, redundancy, load balancing, report design, and the like.

The described computing systems can be networked via wired or wireless network connections. Alternatively, systems can be connected through an intranet connection (e.g., in a corporate environment, government environment, or the like).

The system 100 and any of the other systems described herein can be implemented in conjunction with any of the hardware components described herein, such as the computing systems described below (e.g., processing units, memory, and the like). In any of the examples herein, the inputs, outputs, query execution plan candidates, intermediate representations, and the like can be stored in one or more computer-readable storage media or computer-readable storage devices. The technologies described herein can be generic to the specifics of operating systems or hardware and can be applied in any variety of environments to take advantage of the described features.

Example 3—Example Overall Method Implementing Unified Optimization

Figure 2:
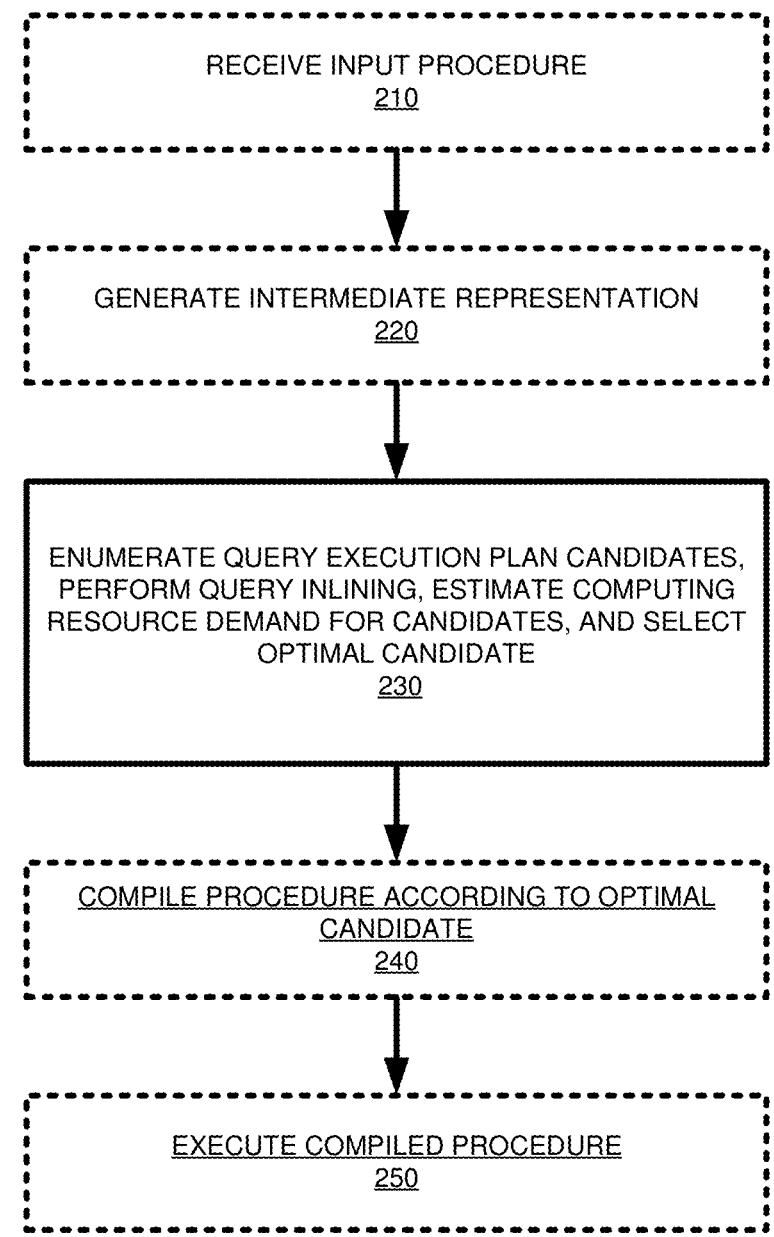
FIG. 2 is a flowchart of another example method of optimizing a procedure having both query statements and imperative statements.

FIG. 2 is a flowchart of an example method 200 of optimizing a procedure and can be performed, for example, by the system of FIG. 1.

In the example, at 210 an input procedure comprising a plurality of statements is received. As described herein, the plurality of statements can comprise a plurality of declarative structured language query (SQL) statements, and a plurality of imperative statements comprising at least one loop.

At 220, an intermediate representation of the input procedure is generated.

At 230, one or more query execution plan candidates are enumerated, query inlining can be performed (e.g., where possible), computing execution resource demand is estimated for the execution plan candidate(s), and an optimal candidate is selected.

As described herein, enumeration of the query plan candidates can comprise performing at least one hoist operation on a query outside a loop boundary. Enumeration can also comprise performing at least one sink operation on a query inside a loop boundary. Query inlining can be performed on at least one query within each of the query plan candidates. To select the optimal candidate query execution plan, the various computing execution resource demand estimates for the various query plan candidates can be considered.

At 240, the procedure can be compiled according to the query execution plan candidate that has been selected as the optimal candidate.

At 250, the compiled procedure can be executed as described herein.

The method 200 and any of the other methods described herein can be performed by computer-executable instructions (e.g., causing a computing system to perform the method) stored in one or more computer-readable media (e.g., storage or other tangible media) or stored in one or more computer-readable storage devices. Such methods can be performed in software, firmware, hardware, or combinations thereof. Such methods can be performed at least in part by a computing system (e.g., one or more computing devices).

The illustrated actions can be described from alternative perspectives while still implementing the technologies. For example, "receive" can also be described as "send" from a different perspective.

Example 4—Example System Implementing Unified Optimization

Figure 3:
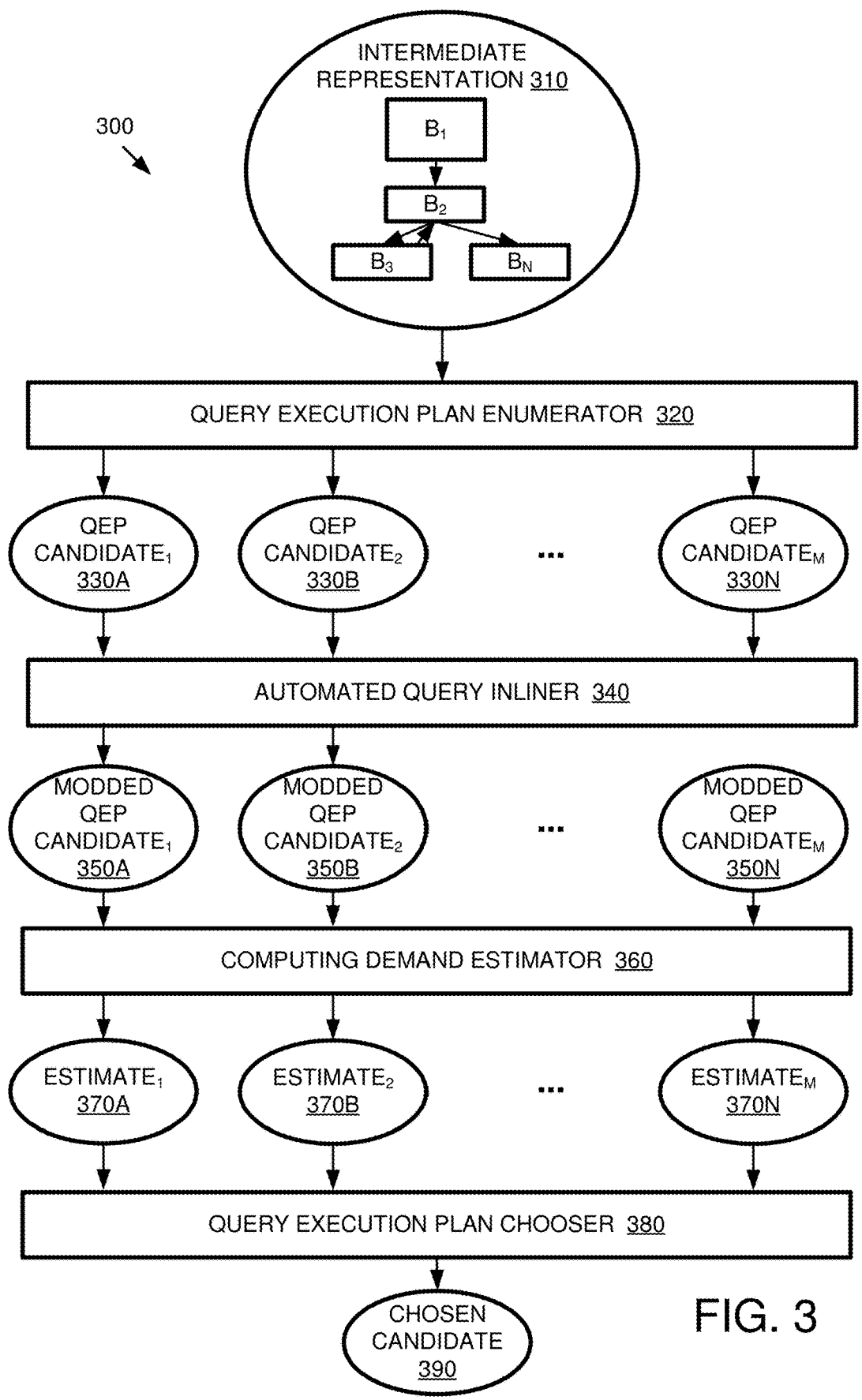
FIG. 3 is a data flow diagram for a system implementing optimization of a procedure having both query statements and imperative statements.

FIG. 3 is a block diagram of a system 300 implementing unified optimization according to any of the examples herein. In the example, a query execution plan enumerator 320 receives an intermediate representation 310 of an input procedure and outputs a plurality of query execution plan candidates 330A-N, as described herein. One or more of the execution plan candidates 330A-N can be further modified by an automated query inliner 340 that inlines one or more queries contained therein within another query (e.g., where possible while preserving program correctness), and outputs modified query execution plan candidates 350A-N.

A computing execution resource demand estimator 360 receives the modified query plan candidates 350A-N and outputs computer resource benefit estimates 370A-N for respective of the candidates 350A-N. The estimates 370A-N are received by a query execution plan chooser 380, which can compare the estimates and determine an optimal query execution plan as described herein. The optimal query execution plan is then output as the chosen candidate 390.

In practice, optimization can be performed on a partial basis so that entire query execution plan candidates need not be generated for inlining and/or estimation. For example, various candidate partial plans (e.g., sub-plans) can be modified by inlining, and computing execution resource demand can be estimated for the various candidate partial plans. An optimal partial plan can be selected for combination with other optimal partial plans to form a complete optimal plan.

Example 5—Example Method Implementing Unified Optimization

Figure 4:
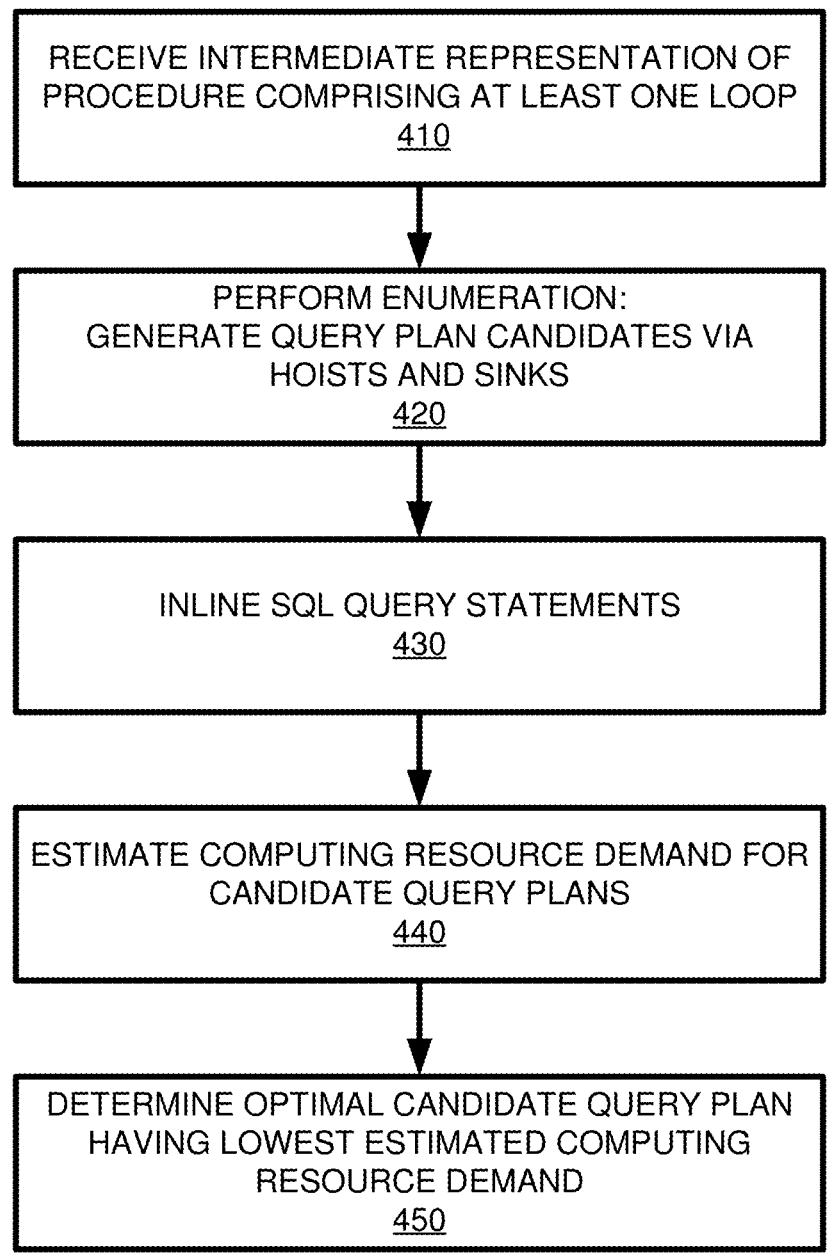
FIG. 4 is a flowchart of an example method of optimizing a procedure having both query statements and imperative statements.

FIG. 4 is a flowchart of an example method 400 of performing unified optimization. The method 400 can be implemented, for example, by a system such as that shown in FIG. 1 or FIG. 3.

At 410, an intermediate representation of a procedure comprising at least one loop is received.

At 420, enumeration is performed to generate a plurality of query plan candidates from the intermediate representation of the procedure. The generating can comprise performing hoist and sink operations on one or more query statements contained in the intermediate representation, as further discussed herein. As part of the generating, it can be determined which hoists/sinks are possible (e.g., while preserving program correctness). In some implementations, hoists may be performed first, followed by sinks, which may in some cases sink some statements that were just hoisted. However, a statement may end up being sinked into a loop different from the one in which it originally resided (e.g., in the input procedure).

At 430, query inlining is performed on at least one query within each of the query plan candidates (e.g., where possible, while preserving program correctness). Query inlining may be particularly beneficial for query statements that were the subject of a sink operation, since statements that are sinked into a loop are likely to be iterated multiple times, and inlining may, e.g., reduce the search space in which they must be executed, as further described herein.

At 440, an estimate of the computing execution resource demands for executing the respective query plan candidates is generated.

At 450, an optimal execution plan for the input procedure is determined, such as by comparing the estimates generated at 440 to determine a candidate query execution plan out of the query plan candidates with a lowest estimated computing resource demand, which may be referred to as the optimal query execution plan candidate as described herein.

Example 6—Example Computing Execution Resource Demand Estimation

In any of the examples herein, the computing resource demand (e.g., cost in terms of computing resources) of execution of a query execution plan can be estimated. Such an estimate can estimate the amount of computing resources consumed when the query execution plan is actually executed. Such an estimate can indicate an amount of time, processing cycles, an amount of memory, a number of threads, or the like that is consumed during execution.

Additionally, such estimates may be generated for entire execution plans, or only portions thereof, such as portions that are changed as a result of a given operation. As such, relative demand estimation can be used in some scenarios to determine whether or not to incorporate a particular operation (e.g., sink) into a query execution plan candidate or the resulting optimal plan.

Example 7—Example Query Execution Plan Enumeration

In any of the examples herein, enumeration can comprise considering a plurality of alternative query execution plans that correctly compute the operations indicated by an input procedure. In practice, not every possible query execution plan need be enumerated. However, different alternatives resulting from different sink operations on different query statements can be enumerated and measured as described herein.

In any of the examples herein, enumeration can comprise moving a query statement in the intermediate representation into a different loop (e.g., that results in increased performance). In any of the examples herein, enumeration can comprise moving a query statement into a loop already having another query statement (e.g., and then inlining is performed on the two query statements). The movement of such query statements can be represented as candidate query execution plans, and an optimal plan can be chosen therefrom. Thus, the optimal query execution plan can integrate query motion across iterative constructs such as loops.

For example, a plurality of query statements can be considered as sink operation candidates for a loop. Based on a data dependency graph representing at least one data dependency relationship for the plurality of statement, at least one of the sink operation candidates can be excluded from consideration. For example, if moving such a candidate breaks program correctness, the candidate can be excluded from consideration for inclusion in a candidate query execution plan.

In some implementations, an initial query execution plan candidate can be generated by performing hoist operations on a plurality of query statements appearing in the intermediate representation of the input procedure. For example, possible (e.g., all possible) hoistable statements can be hoisted in the IR of the input procedure, resulting in the initial query execution plan. Thus, the statements can be checked to see if they are hoistable, and then hoisted if so.

Various permutations of sink operations (e.g., different query statements are sinked into a loop or a query statement is sinked into different loops) can be performed on the initial query execution plan candidate as described herein to generate a plurality of query execution plan candidates for estimation. Those sink operations that break (or potentially break) program correctness can be excluded from consideration, as indicated in a data dependency graph (e.g., either directly or indirectly). Additionally, if a statement is sinkable in more than one loop, it can be considered as not sinkable at all. So, responsive to determining that a statement is sinkable in more than one loop, it can be pruned from the search space. This reduces the search space, and leads to greater efficiency in the optimization process.

Additionally, one can avoid explicitly creating all potential candidate execution plans because it is possible to enumerate only a portion of a given plan (e.g., by using sink subgraphs as described further herein) and performing SQL inlining and/or other optimizations on such a portion. Additionally, various different options for generating a given portion of a plan may be generated one by one and an optimal candidate selected, without generating an entire plan (e.g., via partial plan optimization). In such cases, it may only be necessary to retain the selected candidate for a portion. Thus, incremental optimization can be accomplished by separately considering sink subgraphs (e.g., either serially or in parallel) and incrementally solving optimization by solving the subgraphs (e.g., performing query inlining) on an independent basis (e.g., without explicitly considering the impact on numerous other possibilities). Thus, an optimal arrangement for a subgraph can be found and combined with optimal arrangements for other subgraphs, and sub-optimal subgraphs can be ignored as possibilities for combination with other subgraphs.

Example 8—Example Query Execution Plan

In any of the examples herein, a query execution plan can take the form of a representation of an ordered set of computing actions to achieve calculations of an input procedure. In practice, such plans can be quite complex. Additional metadata, such as a predicted number of iterations for a loop, can be included in the plan representation, which can take the form of an intermediate representation (e.g., basic blocks) as described herein.

In practice, a deprecated query execution plan can be used whenever a query execution plan is described. Such a deprecated plan may not actually be executable, but rather lays out the general steps and ordering of such steps that would result in a correct result for the procedure. For example, candidate query execution plans may not contain all of the operations necessary to achieve a correct result, but may represent those steps that result in the bulk of the computing execution resource demand, or those steps that result in a change to the computing execution resource demand as a result of performing some operation, such as the operations described herein.

At some point before execution, the query execution plan can be completed so that it contains executable instructions (e.g., software code) to actually carry out the procedure. For example, a deprecated plan can be used as a scaffolding into which more detailed operations are inserted.

For sake of convenience, a query execution plan is sometimes simply called a "query plan" or "execution plan" herein. In any of the examples herein, a query execution plan can take the form of an execution plan for a procedure that contains at least one query. The query execution plan can also include operations related to imperative statements. Thus, the query execution plan can take the form of a query-containing execution plan that contains both operations directed to accomplishing processing for a plurality of query statements and operations directed to accomplishing processing for one or more imperative statements.

Figure 5:
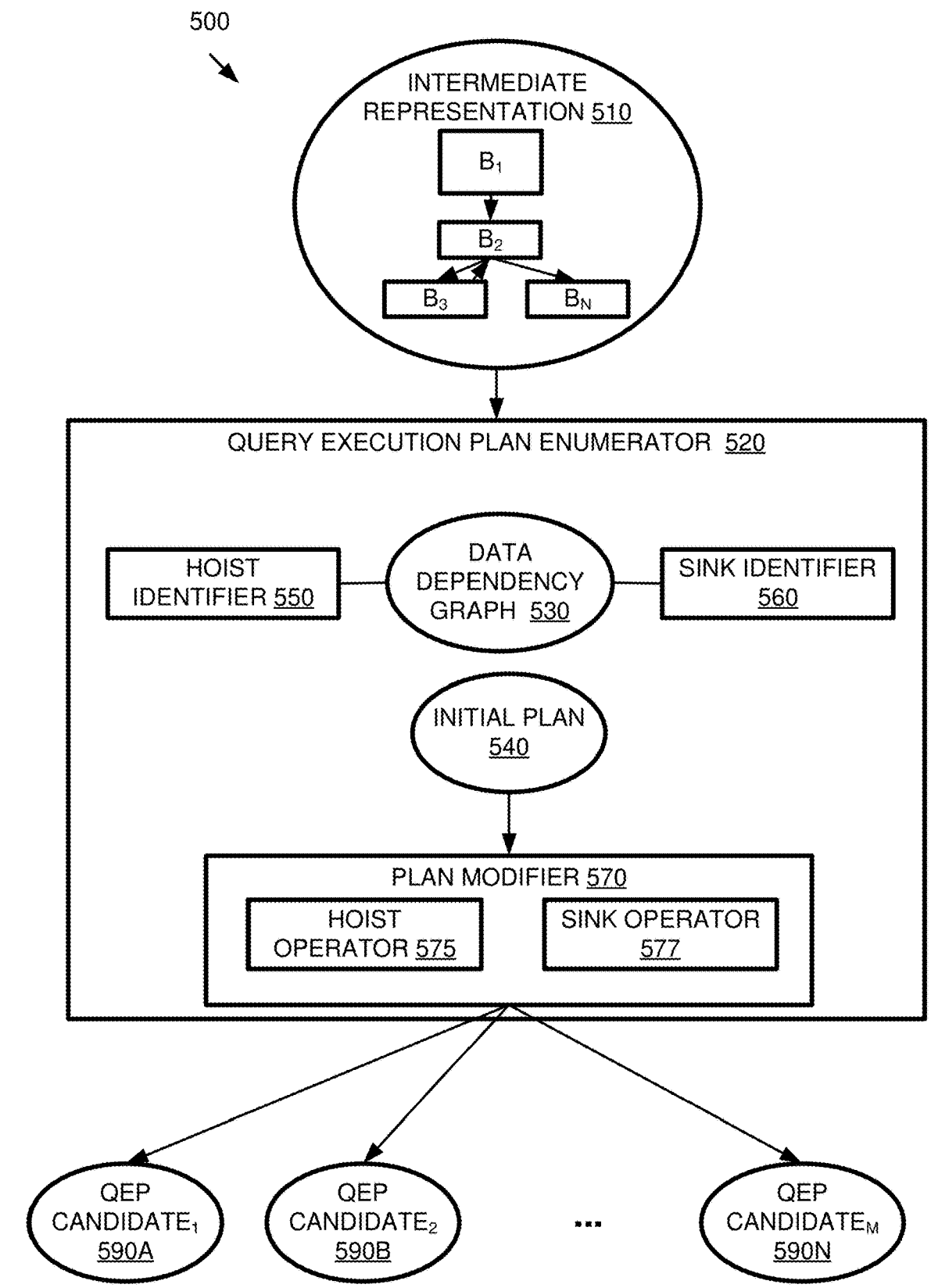
FIG. 5 is a block diagram of an example system implementing optimization of a procedure having query statements and imperative statements.

Example 9—Example System Implementing Query Plan Enumeration for Unified Optimization FIG. 5 is a block diagram of a system 500 implementing query plan enumeration for unified optimization, and can be used to achieve query plan enumeration in any of the examples herein.

In the example, a query execution plan enumerator 520 receives an intermediate representation graph 510 for a computer-implemented procedure comprising a plurality of statements and outputs a plurality of query execution plan candidates 590A-N.

In some cases, the plurality of statements can comprise a plurality of query statements, and a plurality of imperative statements comprising at least one loop. In some cases, at least one of the plurality of statements in the intermediate representation 510 has data dependency on another statement among the plurality of statements.

The query execution plan enumerator 520 can generate a data dependency graph 530 representing dependencies between the plurality of statements. Based on identified dependencies, a hoist identifier 550 can identify one or more of the plurality of statements inside the loop that can be hoisted out of the loop. The hoists can be performed prior to any sink operations, or they may be performed in conjunction with sink operations, as further described herein. In cases where the possible hoists are performed first, an initial execution plan 540 can be generated reflecting these hoists. In other cases, the initial execution plan 540 can simply reflect the original execution plan derived from the received intermediate representation 510.

Based on identified dependencies, a sink identifier 560 identifies one or more of the plurality of statements outside the loop that can be sinked inside the loop. Such sinks can be performed on an initial execution plan, after a set of initial hoist operations are performed, or in conjunction with hoist operations, as further described herein.

A plan modifier 570 comprises a hoist operator 575 to perform hoist operations, and a sink operator 577 to perform sink operations. The plan modifier 570 can perform the hoist and sink operations on an initial execution plan 540 derived from the received intermediate representation 510.

Additionally or alternatively, a sink operator 577 can perform sink operations on an initial execution plan 540 that has been generated as a result of the hoist operator 575 first performing all possible hoist operations identified by the hoist identifier 550, followed by the sink operator performing one or more potential sink operations identified by sink identifier 560 to generate a plurality of query execution plan candidates 590A-N, which may be used as the query execution plan candidates 330A-N of FIG. 3. In IRs having multiple loops, the system may repeat the above operations for the other loops to potentially generate additional query plan candidates, as further described herein.

Figure 6:
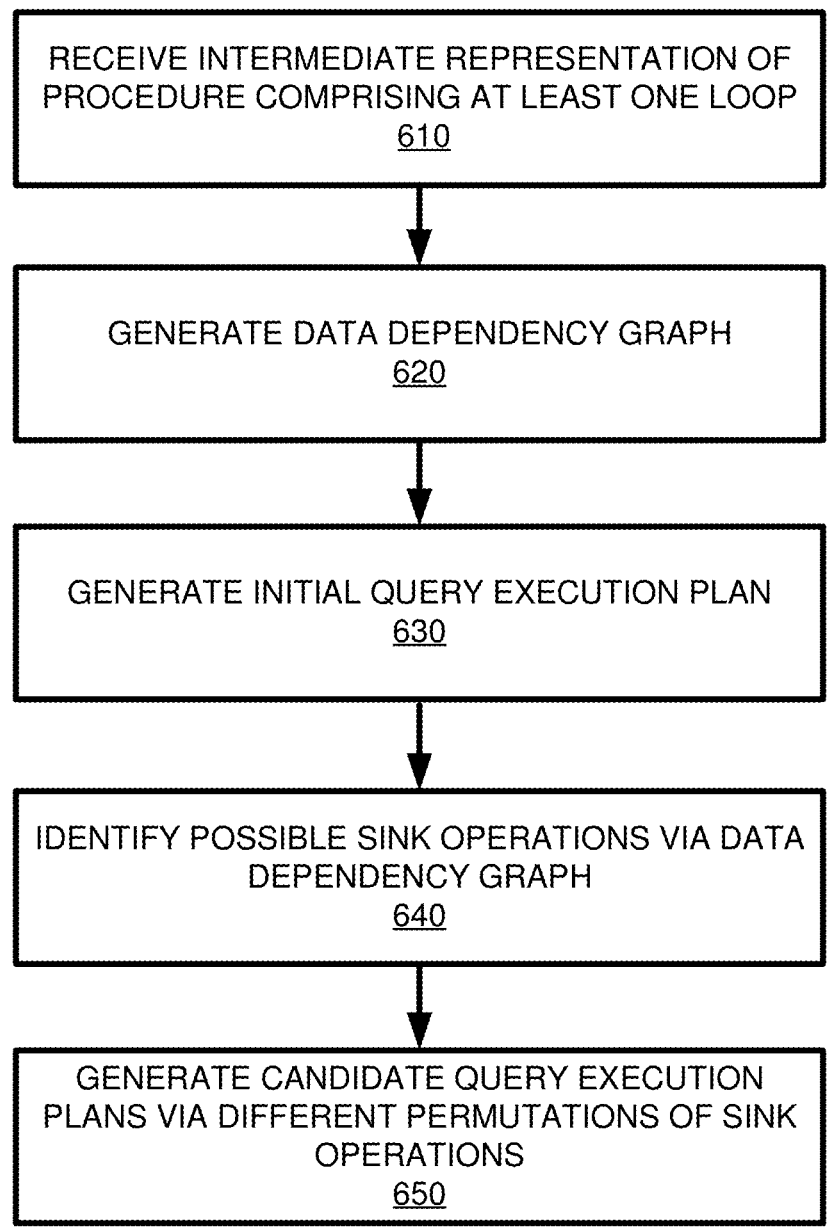
FIG. 6 is a flowchart of another example method of optimizing a procedure having query statements and imperative statements.

Example 10—Example Method Implementing Query Plan Enumeration for Unified Optimization FIG. 6 is a flowchart of an example method 600 of implementing query plan enumeration for unified optimization and can be implemented, for example, by the system of FIG. 5.

The method 600 comprises receiving an intermediate representation graph 610 for an input procedure comprising a plurality of statements and at least one loop. In some cases, the plurality of statements can comprise a plurality of declarative query statements, and a plurality of imperative statements comprising the at least one loop. In some cases, at least one of the plurality of statements in the received intermediate representation has data dependency on another statement among the plurality of statements.

At 620, a data dependency graph is generated showing the data dependencies between statements.

Enumeration can proceed by, at 630, generating an initial query execution plan, where such generation comprises using data dependencies—such as those represented in the data dependency graph—to identify possible hoists and performing hoists wherever possible.

Subsequently, at 640, data dependencies are again used to identify possible sink operations via the data dependency graph. It should be noted that some sink operations may not be possible because implementing them may interfere with the query execution plan, such as where interfering statements exist that prevent sinking a statement outside of the loop to its using statement inside the loop, because moving the statement outside of the loop inside the loop will affect the statement's output. Such "interfering" statements are described further herein.

At 650, a variety of query execution plan candidates are generated by performing different permutations of potential identified sink operations, where those potential sink operations are not affected by interfering statements. In some cases, there are multiple possibilities for where a given statement or set of statements may be sinked, and further processing may be performed to determine which of the potential sink operations is optimal, as further described herein. In other cases, multiple alternative sinks are performed to generate candidate query execution plans, which can then be output for further processing, such as query inlining, computing execution resource demand estimation, or the like. In some cases a sink operation may "undo" a previous hoist operation, such as by sinking a statement in the initial execution plan that has previously been hoisted from the intermediate representation, based on an identified data dependency.

These generated candidate query plans may be used as the query execution plan candidates 330A-N of FIG. 3. In IRs having multiple loops, the system may repeat the above operations for the other loops to potentially generate additional query plan candidates, as further described herein.

Example 11—Example Procedures

In any of the examples herein, the technologies can accept an input procedure for optimization. The input procedure can take the form of a set of statements (e.g., computer source code) that are typically directed to performing a task or function. Complex analytical queries using control flow logic can be supported. In practice, the technologies are particularly helpful in user-defined function (UDF) scenarios because such functions typically do not benefit from developer resources that can design in optimizations from the beginning. However, any procedure that includes at least one query statement and at least one loop can benefit from the technologies described herein.

In any of the examples herein, a procedure can comprise at least one query statement and at least one loop (e.g., implemented by an imperative statement). One or more other imperative statements can also be included.

In practice, there are data dependencies between the statements of the procedure, which can be represented by a data dependency graph as described herein.

Example 12—Example Data Dependency Graph

In any of the examples herein, a data dependency graph can represent dependencies between statements of the input procedure (or intermediate representation thereof). Nodes can represent statements, and edges can represent the dependencies. In some cases, multiple different types of edges may exist between two nodes, and bit fields can be used to encode such information to represent an edge.

Such a graph can be helpful in any of the examples herein to determine whether performing a hoist or sink is possible (e.g., while preserving program correctness). In some cases, an indirect dependency may be indicated, even if the graph does not explicitly indicate a direct dependency. Various hoist or sink operations can be excluded from consideration based on the data dependency graph.

Example 13—Example Intermediate Representation (IR) Graph

In any of the examples herein, a procedure can be internally represented via an intermediate representation (IR) graph. Such an intermediate representation typically comprises nodes for basic blocks of the program and edges to reflect control flow (e.g., execution path) within the blocks. In practice, any number of tools can be used to generate an intermediate representation of a procedure.

Figure 7:
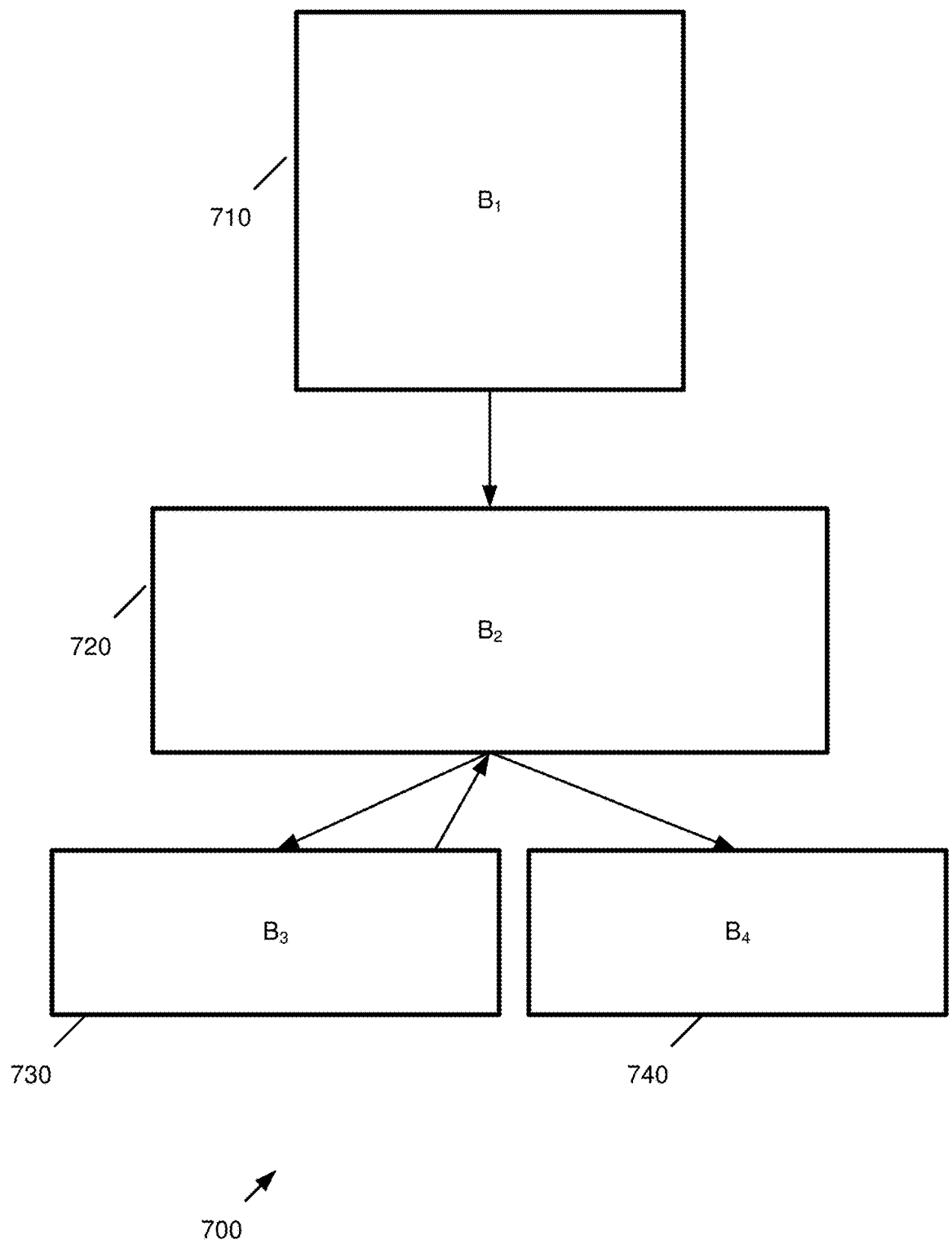
FIG. 7 is a block diagram of an example intermediate representation of a procedure.

FIG. 7 is a block diagram of an example IR graph 700 of a procedure that can be used in any of the examples herein. In the example, a first basic block 710 is represented by a node in the graph 700. Other nodes include 720, 730, and 740. A basic block can represent a straight-line statement sequence with no branches except at its entry and no branches out except at the exit. The IR is a directed graph, and edges between the nodes represent control flow. So, in the illustrated example, the edge between first basic block 710 and a second block 720 indicates process flow from first block 710 to second block 720.

The blocks can contain one or more statements, which may include query statements, as further described below. The IR graph also represents so-called imperative procedure code and loops, which are further discussed herein.

Example 14—Example Query Statements

In any of the examples herein, a query statement can take the form of a statement that represents a desired query operation. Such statements can include, e.g., SELECT or JOIN statements. For example, a query statement can include structured language query (SQL) statements or query statements developed according to other conventions. Query statements are sometimes called "declarative" because they specify the logic of a computation without describing the actual control flow. They are thus distinguished from the imperative statements described herein, in which actual control flow constructs (e.g., loops) can be specified. As described herein, query statements can be moved into or out of such loops when generating candidate query execution plans. Such query motion can result in a candidate plan that exhibits considerable and unexpected superior computing performance compared to the original, unoptimized procedure.

Example 15—Example Imperative Statements

In any of the examples herein, imperative statements can include procedure statements that perform various non-query operations to achieve processing. Iterative code statements can be used to implement loops and conditionals in the procedure.

Conditional code can be represented as three basic blocks: a conditional block, a true block, and a false block. A conditional block can have a logical statement and a branch statement. A logical statement can contain a logical operator and it assigns a true or false value to a variable. A branch statement indicates the basic block to be executed next according to the logical variable. To represent the control flow, a conditional block is connected to a true block and a false block on the IR graph. Loop code is discussed further below.

Example 16—Example Iteration

In any of the examples herein, iteration and iterative statements can include programming scenarios involving a known number of iterations (e.g., a for scenario specifying n repetitions) and an unknown number of iterations (e.g., a scenario that depends on other data or a conditional). In practice, it may be more difficult to estimate the computing execution resource demand for certain iterative scenarios, but the technologies can achieve improvement in any number of scenarios.

Example 17—Example Loop and Loop Boundary

In any of the examples herein, a loop can take the form of code in an input procedure that is executed repeatedly. Loops are therefore also called "iterative constructs" herein because they involve iterating over code a repeated number of times. Such repeated execution can be achieved via programming conventions such as conditionals (e.g., if), while/do, do, for, repeat/until, or the like. Code for a loop can be represented in the intermediate representation as two basic blocks: a loop head block, which can also be referred to as a loop condition block, and a loop body block, which can be referred to herein as a loop boundary or "inside the loop" (as opposed to code outside the loop body block, which can be referred to as "outside the loop boundary" or "outside the loop"). The loop head block has a logical and a branch statement to decide the number of iterations. To represent the control flow, the loop head block is connected to the loop body block and the other block on the IR graph. The loop body block is also connected to the loop condition block.

So, returning again to FIG. 7, second block 720 can be understood as a loop head block, which in addition to following basic block 710 in the control flow, is connected to two additional blocks, a loop body lock 730, and a fourth block 740, which may be, e.g., an exit block, or may refer to another basic block containing further statements to execute before exiting. One or more statements may be contained within loop body block 730. Such statements may be considered "inside the loop" or "within the loop boundary." Similarly, statements located outside of the loop body block 730, such as any statements contained in basic block 710, may be considered "outside the loop boundary," or simply "outside the loop."

As described herein, hoist and sink operations can be performed to move query statements into or out of a loop.

Example 18—Example Declarative Structured Language Query (SQL) Statement

In any of the examples herein, a query statement can take the form of an SQL statement. Structured query language, or SQL is an international standard for database manipulation. Although there are many different database types, the most common is the relational database, which consists of one or more tables, consisting of records, or rows, of data. The data for each row is organized into discrete units of information, known as fields or columns. In a relational database, many of the fields have a relationship between them. In order to utilize data from a database, we want to be able to analyze the data in a variety of ways. One way to accomplish this is to select certain data from the database using a SQL query. As part of such a query, a SQL assignment statement may be used. Generally, an assignment statement s is represented as a 2-tuple ($v_s$, $e_s$), where $e_s$ is an expression and $v_s$ is a variable to assign the result of $e_s$. If $e_s$ is an expression for a select query, the result of the query execution is assigned to $v_s$. In this case, the statement is called the SQL assignment statement, and $v_s$ is called a table variable. If $e_s$ has no result, $v_s$ has a 0 value. A SQL SELECT statement may be used to retrieve records from one or more tables in a SQL database. Such statements do not provide instructions as to how the data is to be retrieved, but merely provide the information that is desired to be retrieved. As such, the use of SQL SELECT statements is often referred to as declarative programming, as contrasted with the imperative programming types discussed above.

Example 19—Example IR of an Execution Plan

Figure 8:
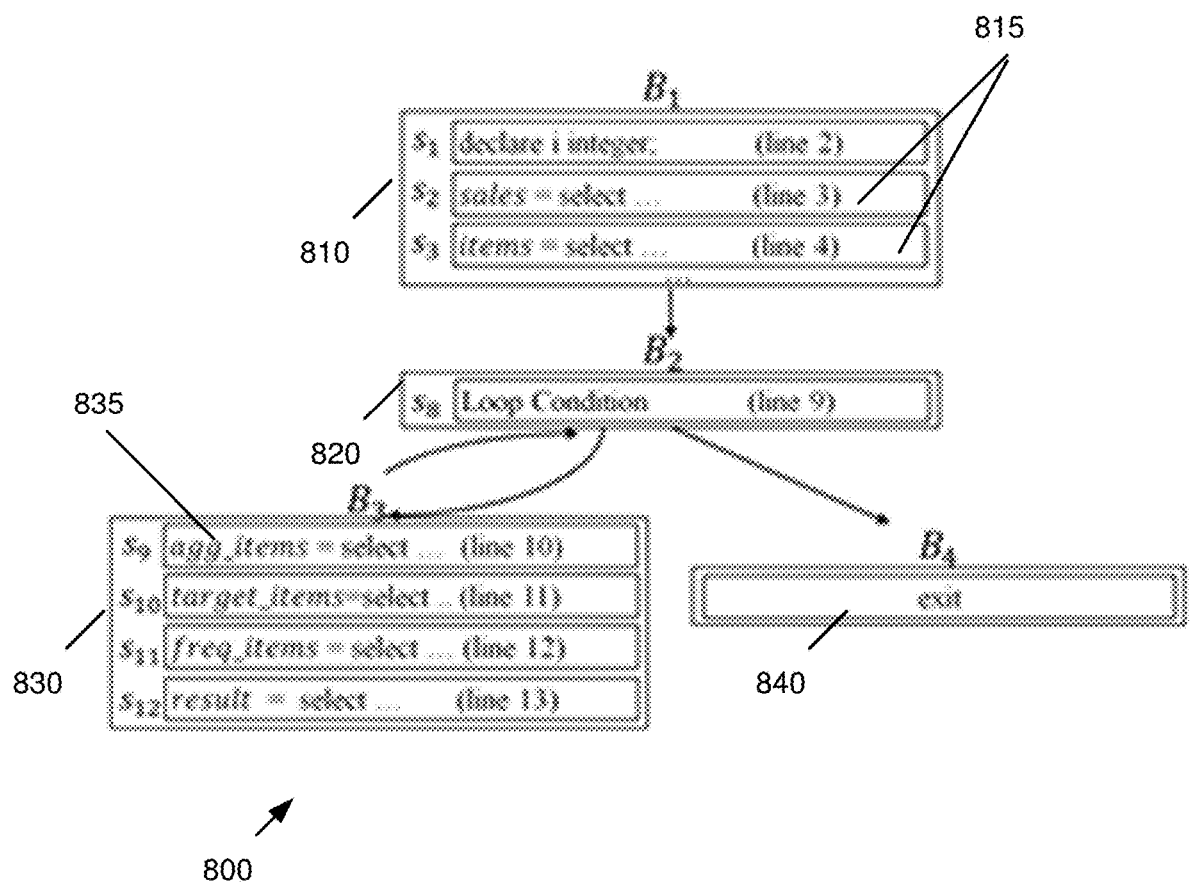
FIG. 8 is a block diagram of an intermediate representation of an example original execution plan for an example procedure.

FIG. 8 is a block diagram of an IR 800 of an example execution plan for an example procedure. Because no hoist or sink operations have yet been performed, it may also be referred to as an original execution plan.

Similar to IR 700, in IR 800, a first basic block 810 is represented by a node in the graph and connected to a second node, loop head block 820. Loop head block 820 further connects to two nodes, loop body block 830, and exit block 840. Within basic block 810 are a plurality of statements 815, among them statements $s_2$ and $s_3$. These statements are outside of the loop, inasmuch as they are not within loop body block 830. Within loop body block 830 are a plurality of statements 835, among them statement $s_9$. These statements 835—including statement $s_9$—are considered within the loop, inasmuch as they are situated within loop body block 830.

Various operations can be performed on the intermediate representation 800 to achieve enumeration. For example, hoist and sink operations can be used to move statements within the IR. In practice, statements cannot be indiscriminately moved within the IR because such moves can cause the resulting graph to be incorrect (e.g., the operations as represented do not achieve the same result as the original).

However, there are a number of operations that can be performed while preserving program correctness. Among these, are hoist and sink operations, and query inlining, each of which is described in more detail herein.

Example 20—Example Hoist Operation

Figure 9:
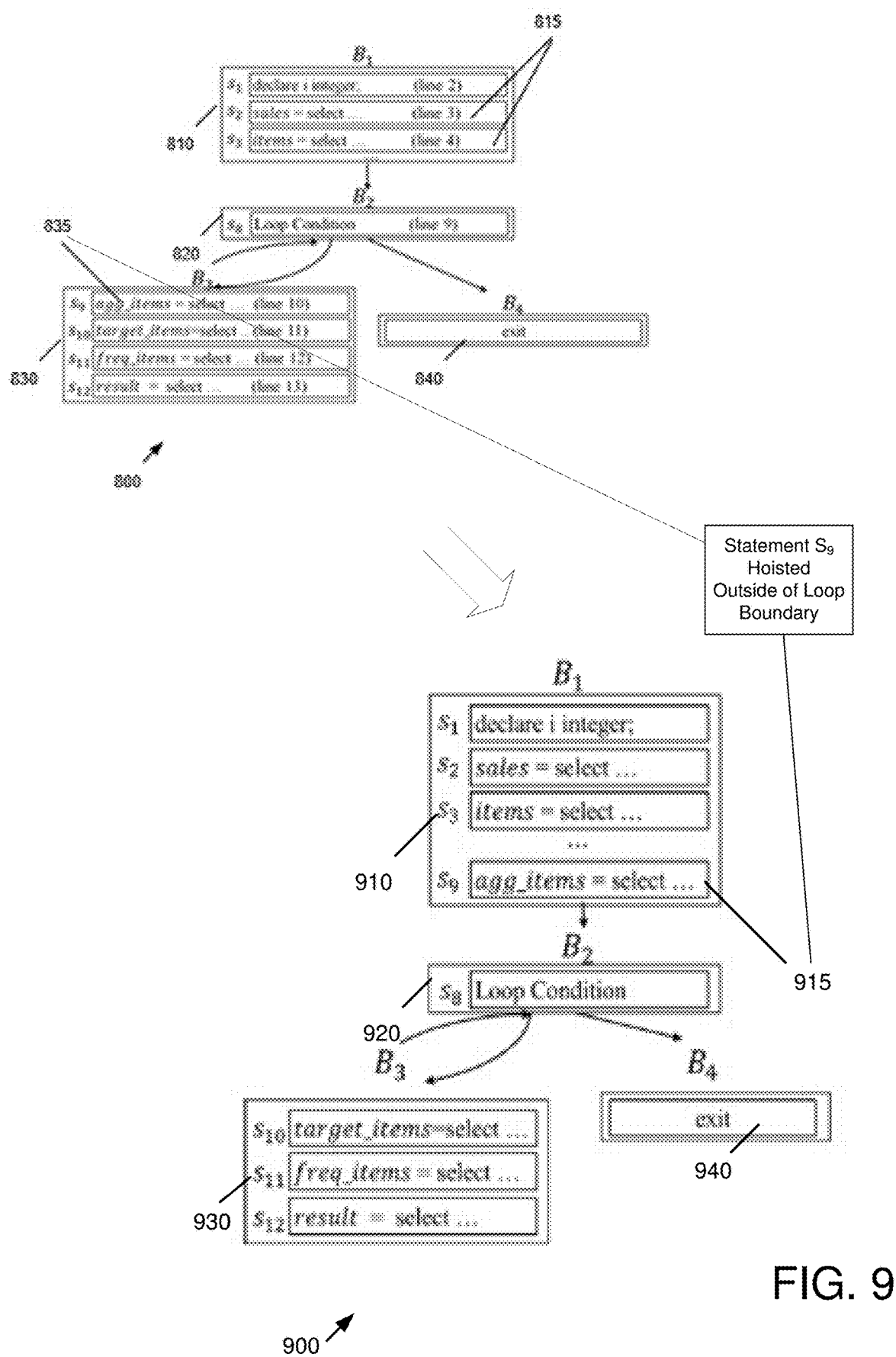
FIG. 9 is a block diagram of an example alternative execution plan after hoisting the hoistable statements in the original execution plan of FIG. 8.

FIG. 9 is a block diagram of an example IR 900 after performing a hoist operation on a statement from the intermediate representation of FIG. 8. In general, loop invariant statements can be "hoisted" out of the loop (moved outside the loop) if they have idempotence for the loop (their output does not change regardless of how many times the loop is iterated). Loop invariant statements are further described below.

Similar to IR 800, IR 900 has a first basic block 910 represented by a node in the graph and connected to a second node, loop head block 920. Loop head block 920 further connects to two nodes, loop body block 930, and exit block 940. Within basic block 910 are a plurality of statements 915, among them statement $s_9$. In IR 800, as illustrated, $s_9$ was previously inside the loop as statement 835. However, it has been "hoisted" outside the loop. In a hoist operation, the "hoisted" statement is typically appended behind the last statement in the block preceding the loop, here basic block 910. In some cases multiple "hoistable" statements may exist, and may similarly be placed in the preceding block if they are so identified as "hoistable" statements

Example 21—Example System Identifying Hoistable Statements

Figure 10:
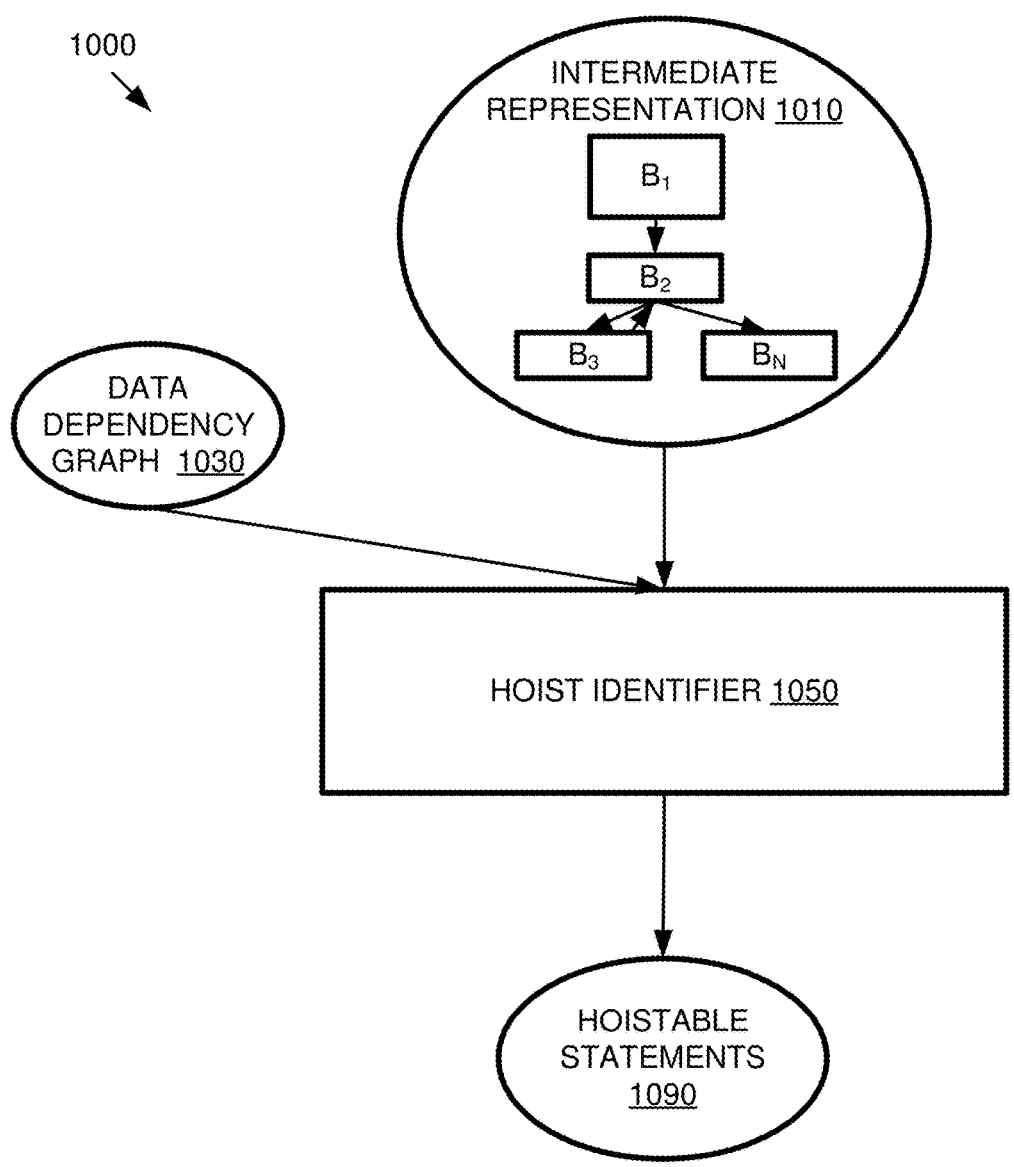
FIG. 10 is a block diagram of an example system for identifying hoistable statements.

FIG. 10 illustrates an example system 1000 identifying whether a given statement is hoistable (e.g., can be hoisted while preserving program correctness). In the example, a computing environment 1000 can include an intermediate representation 1010, which can include a plurality of SQL statements, and a plurality of imperative statements, including at least one loop. IR 1010 can be processed by a hoist identifier 1050. The hoist identifier may further take as input a data dependency graph 1030 (described further herein) showing dependency between the statements. Hoist identifier 1050 may then identify a set of one or more hoistable statements 1090, such as by performing the example method described below, and returns as output the set of hoistable statements 1090.

In practice, single statements can be checked seriatim to see if they are hoistable.

Example 22—Example Method of Identifying Hoistable Statements

Figure 11:
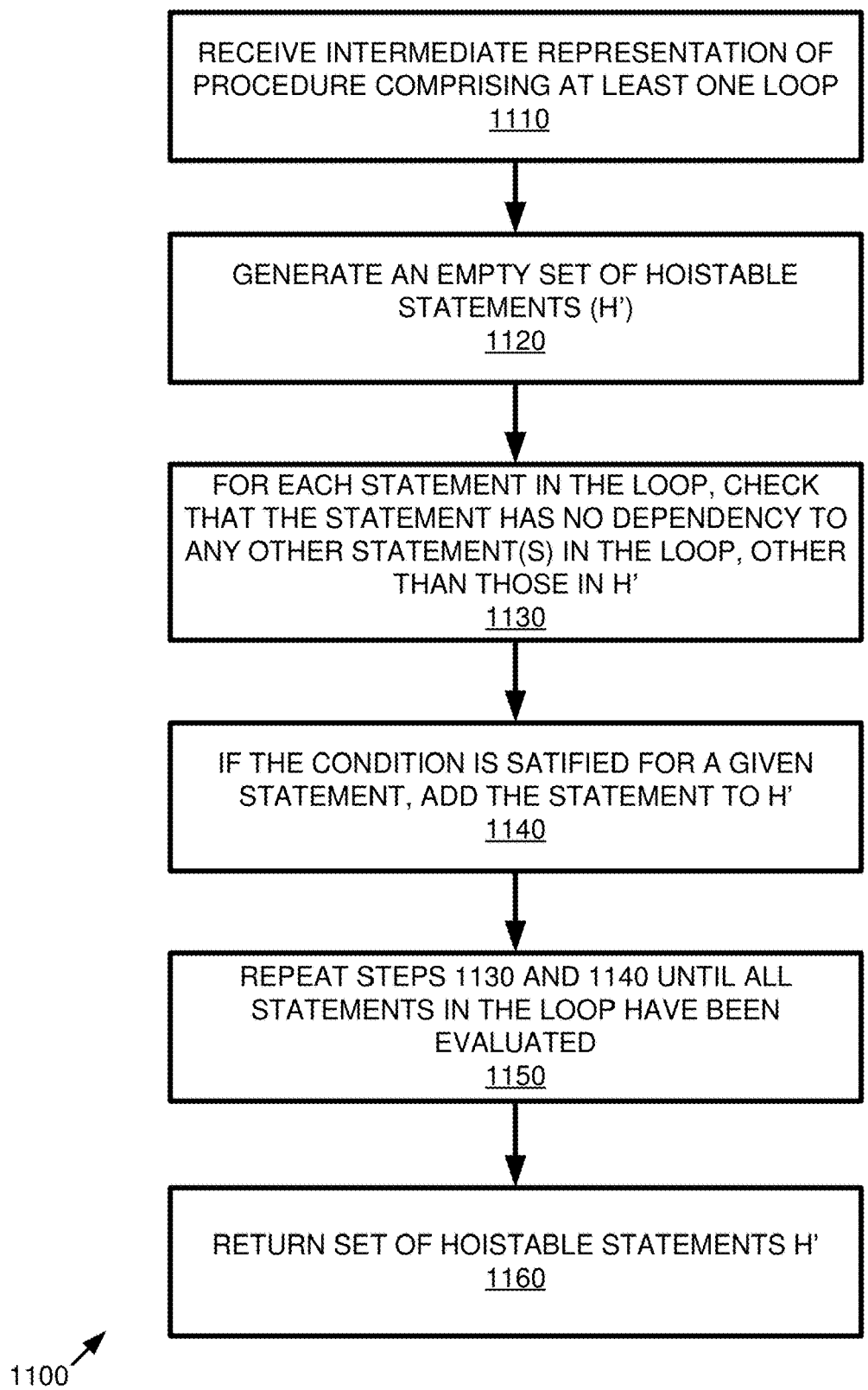
FIG. 11 is a flowchart of an example method for identifying hoistable statements.

FIG. 11 is a flowchart of an example method 1100 of identifying whether a given statement or set of statements in a loop in an intermediate representation is/are hoistable. The operations 1100 begin at 1110, such as by receiving an intermediate representation of a procedure comprising at least one loop. The IR can comprise a plurality of statements, which in some cases can comprise a plurality of declarative structured language query (SQL) statements, and a plurality of imperative statements comprising at least one loop. At 1120, an empty set of hoistable statements (H') is generated. At 1130, each statement in the loop is checked, to determine whether it has dependency to any other statement(s) in the loop, other than those previously added to H'. At 1140, if no such dependencies exist for a given statement, that statement is added to H'. At 1150, the process of 1130 and 1140 is repeated until the statements in the loop have been evaluated. Once the statements have been evaluated, at 1160 a set of hoistable statements H' is returned. If there are multiple loops in a given IR, this same process may be repeated for each such loop until all loops have been exhausted.

In some examples, this process may be performed on SELECT statements contained within a loop, and one or more SELECT statements may be identified within the loop boundary that do not have any dependency to any other statement within the loop boundary, and are therefore considered hoistable statements. In some cases, there may be a plurality of such statements. In still further cases, all SELECT statements within a loop may be identified using this process as hoistable statements.

Example 23—Example Sink Operation

Figure 12:
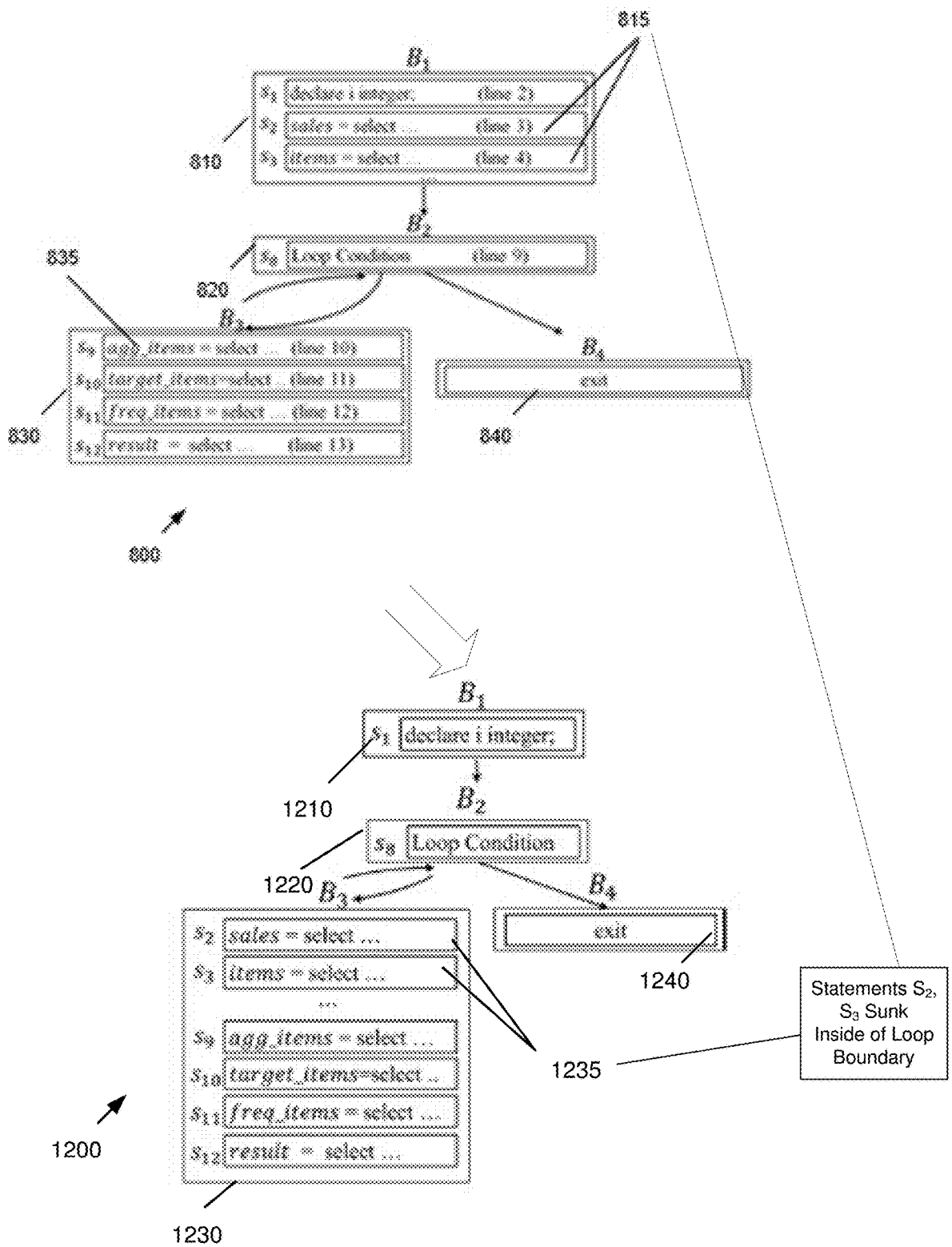
FIG. 12 is a block diagram of an example alternative execution plan after sinking the sinkable statements in the original execution plan of FIG. 8.

FIG. 12 is a block diagram of an example IR 1200 after performing a sink operation on a statement from the intermediate representation of FIG. 8. In general, a statement outside a loop can be "sinked" inside the loop (moved inside the loop) if: a) there is a statement inside the loop that has dependence on the statement outside the loop, and b) there are no interfering statements (i.e., other statements outside the loop that might affect the results of the statement outside the loop if it is moved before the consuming statement inside the loop). Data dependency, including flow dependency, and interfering statements, are further described herein.

Similar to IR 800, IR 1200 has a first basic block 1210 represented by a node in the graph and connected to a second node, loop head block 1220. Loop head block 1220 further connects to two nodes, loop body block 1230, and exit block 1240. Within loop body block 1230 are a plurality of statements 1235, among them statement $s_2$ and $s_3$. In IR 800, as illustrated, $s_2$ and $s_3$ were previously outside the loop as statements 815. However, they have been "sinked" inside the loop. In a sink operation, the "sinked" statements are typically placed before—and where possible inlined with—the statements inside the loop that use them, in this case, the other statements within loop body block 1230. In some cases, only one such "sinkable" statement may exist, while in other cases, there may be two or more such statements. In some cases, there may be multiple options for performing sink operations, and a process may be performed to enumerate all such alternatives, such as preparing sink subgraphs, as further described herein.

Example 24—Example System of Identifying Sinkable Statements

Figure 13:
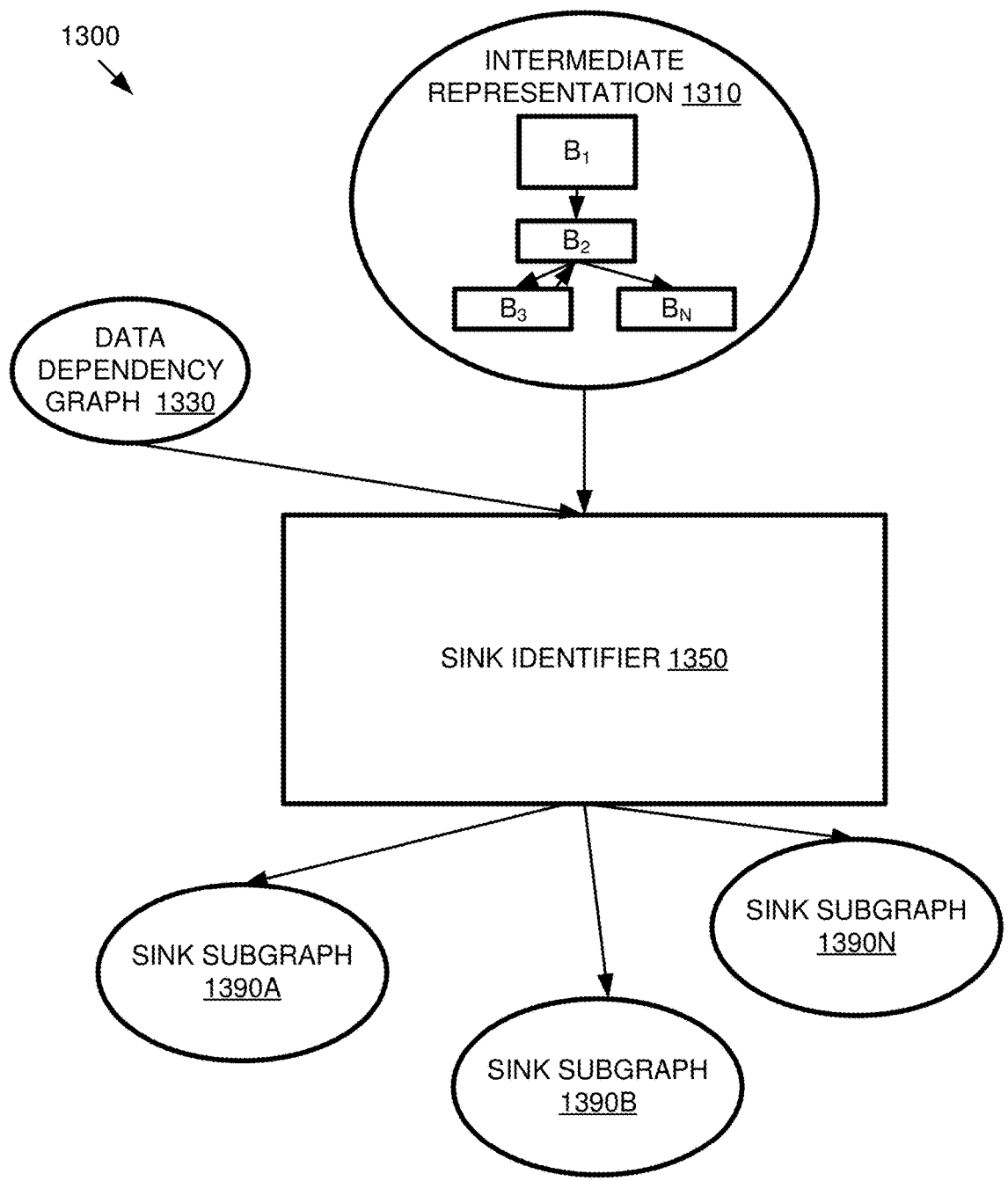
FIG. 13 is a block diagram of an example system for identifying sinkable statements.

FIG. 13 illustrates an example system 1300 of identifying whether a given statement or set of statements is sinkable (e.g., can be sinked without breaking program correctness). In the example, a computing environment 1300 can include an intermediate representation 1310, which can include a plurality of SQL statements, and a plurality of imperative statements, including at least one loop. IR 1310 can be processed by a sink identifier 1350, which can take as input a data dependency graph 1330, and can use data dependencies to identify one or more sinkable statements, such as by performing the example method described below. In doing so, the sink identifier may enumerate and return as output one or more sink subgraphs 1390A-N reflecting different potential combinations of sinkable statements that may be sinked within the loop.

The different sink subgraphs may result in a different set of statements being sinked into the loop. The different sink operations may result in a different or alternative execution plan, and the alternative execution plans may be separately evaluated to determine relative benefit in terms of minimizing computing resources over an execution plan prior to performing the respective sink operation, as further described herein.

Example 25—Example Method of Identifying Sinkable Statements

Figure 14:
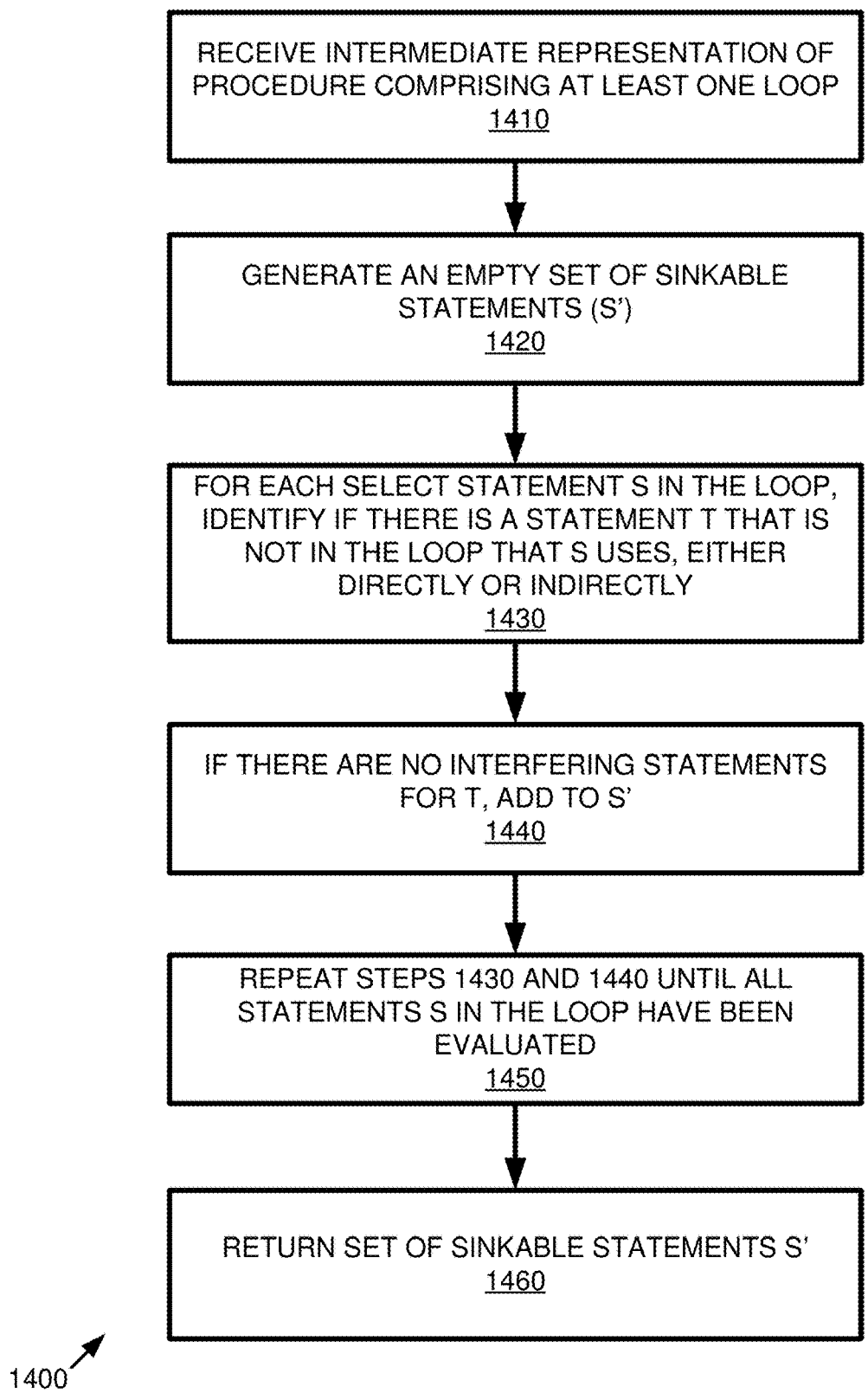
FIG. 14 is a flowchart of an example method for identifying sinkable statements.

FIG. 14 is a flowchart of an example method 1400 of identifying whether a given statement is sinkable (e.g., can be sinked while preserving program correctness). The operations 1400 begin at 1410 by receiving an intermediate representation of a procedure comprising at least one loop. The IR can comprise a plurality of statements, which in some cases can comprise a plurality of declarative structured language query (SQL) statements, and a plurality of imperative statements comprising at least one loop. This IR may in some cases be an initial execution plan that is derived from an intermediate representation, while in other cases it may be an initial execution plan that is generated by performing all possible hoist operations on a received intermediate representation for the procedure.

At 1420, an empty set of sinkable statements (S') is generated.

At 1430, each SELECT statement S in the loop is checked, to identify whether there is a statement T that is outside the loop that S uses, either directly or indirectly.

At 1440, it is determined for statement T identified in 1430 whether there are any interfering statements, and if not, then T is added to the set of sinkable statements S'. At 1450, this process is repeated until the statements S in the loop have been evaluated. Once it is determined that the statements have been evaluated, the set of hoistable statements S' is returned.

In performing the method, the set of sinkable statements S' may comprise one or more sink subgraphs reflecting different potential combinations of sinkable statements that may be sinked within the loop. Each of these sink subgraphs may represent a different subset of sinkable statements that may be sinked into the loop. Each of these different potential sink operations may result in a different or alternative execution plan, and each of these alternative execution plans may be separately evaluated, as further described herein, to determine its relative benefit in terms of minimizing computing resources versus an execution plan prior to performing the respective sink operation.

In some cases, identifying a statement T outside the loop boundary that is used by at least one SELECT statement inside the loop boundary for which there are no interfering statements comprises determining that moving the statement T inside the loop boundary will not affect the operation of the statement, such as by changing its output as a result of the existence of one or more interfering statements (e.g., statements on which T also has dependence). In some cases identifying such statements T comprises identifying a plurality of statements T.

In some cases, the intermediate representation may comprise a plurality of loops, and the procedure may be repeated for each of the loops. In some instances, the operation may comprise identifying two different loops into which a loop may be sinked, and either returning a set of sinkable statements for each loop that includes sinking the statement T, or in some instances, identifying into which of the loops it is most efficient to sink the loop, such as by evaluating an estimated benefit to computing resources expected to be achieved by performing a sink operation moving the statement into a first loop and an estimated benefit to computing resources expected to be achieved by performing a sink operation moving the statement into a second loop, and identifying the sink operation providing an optimal relative expected benefit to computing resources, such as using the techniques described further herein.

Example 26—Example Query Miming

In any of the examples herein, query inlining can be incorporated into a query execution plan. In practice, the plan represents a proposed query inlining, and the computing execution resource demand can be estimated based on the inlining.

In order to optimize the declarative query statements in a procedure, a stored procedure can provide a feature called "query inlining" (or simply "inlining") that places query statements with data dependencies within a single query, or "inlines" them. SQL inlining can improve the quality of the query plan by applying more query optimization rules. Such extensions allow complex queries to be managed by dividing them into multiple smaller and understandable queries. The results of the divided queries are assigned to table variables and the divided queries are combined through these table variables to have the same semantics as the original complex queries. Such extensions have not previously been applied to imperative procedure code with loop and conditional logic.

Query inlining can be advantageously applied to imperative procedure code with loop and/or conditional logic. In order to do so, an optimization technique can consider both the traditional programming optimization and the execution plan of the inlined query. Query inlining poses challenges when applied to a cross optimization technique considering the declarative query statements and the imperative procedure codes. And, it can be difficult or time consuming to rewrite the imperative procedure code mixed with query statements to improve the execution plan of queries. Therefore, a solution can focus on loop optimization within the imperative procedure code, since the loop in a procedure occupies a large portion of the overall computing execution resource demand of the procedure.

Loop invariant code motion optimization improves the performance of a procedure by moving loop-invariant code contained within a loop outside that loop. However, the performance of a procedure can also be improved in some cases when a query outside the loop is inlined to a query inside the loop. While this approach can seem counterintuitive given that moving a procedure outside a loop inside a loop can result in that procedure being iterated numerous times, which might seem to be less efficient, query inlining into the analytical queries can enhance the quality of the execution plan of that inlined query in some cases, which are described in more detail herein.

Query statement inlining (sometimes referred to as "SQL Statement Inlining" herein) can enhance the quality of the execution plan for an inlined statement. If a query is executed independently, query optimization is performed considering only each relational operator. But if multiple queries are inlined, query optimization is performed in a wider search space because many operators can be included. Various optimization rules such as the join reordering, predicate push down, and group by simplification can be applied over the inlined statement. In general, if two query statements have a flow data dependency (further explained herein), they can be inlined and executed as a single query.

Figure 15:
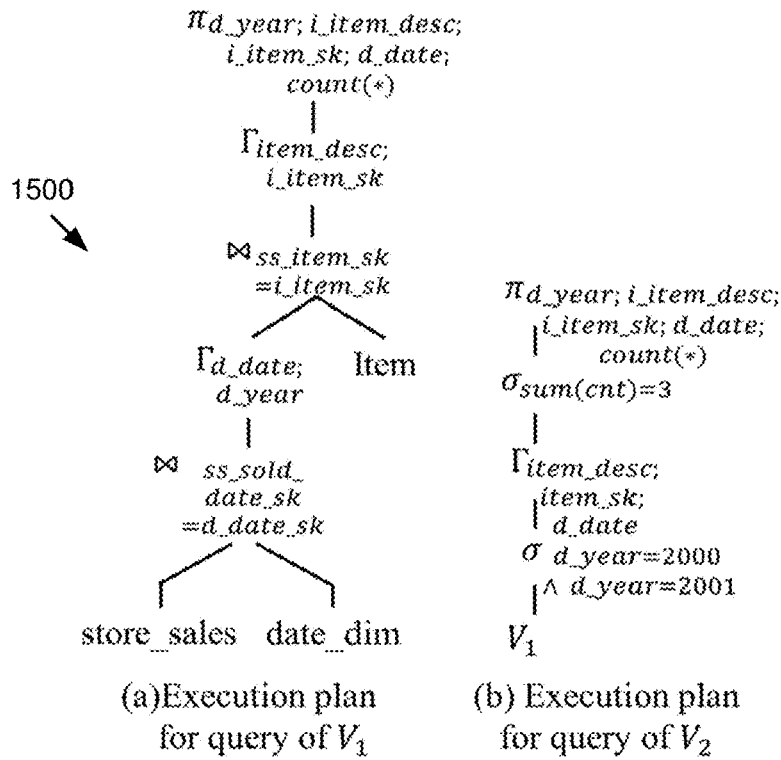
FIG. 15 is a flow diagram illustrating combining two queries using inlining.
Figure 15:
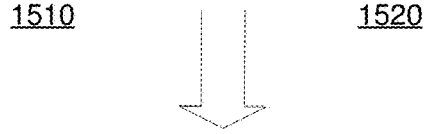
Figure 15:
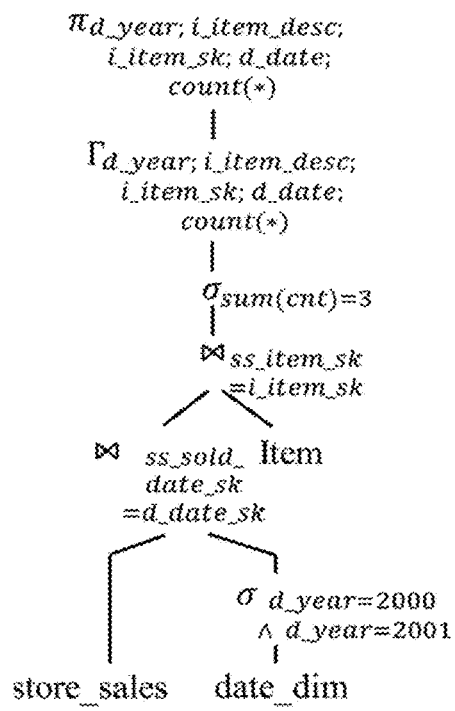

FIG. 15 is a flow diagram illustrating a method 1500 of combining two queries using inlining A first query execution plan for a first query $v_1$ is shown at 1510. A second query execution plan for a second query $v_2$ is shown at 1520. Inlined execution plan 1530 shows an optimized execution plan for the query statement of inlined queries $v_1$ and $v_2$. Further details regarding query statement inlining are provided in the detailed example provided herein.

In some cases, inlining may be performed to inline a statement that was previously the subject of a sink operation into its using statement within a loop boundary.

Figure 16:
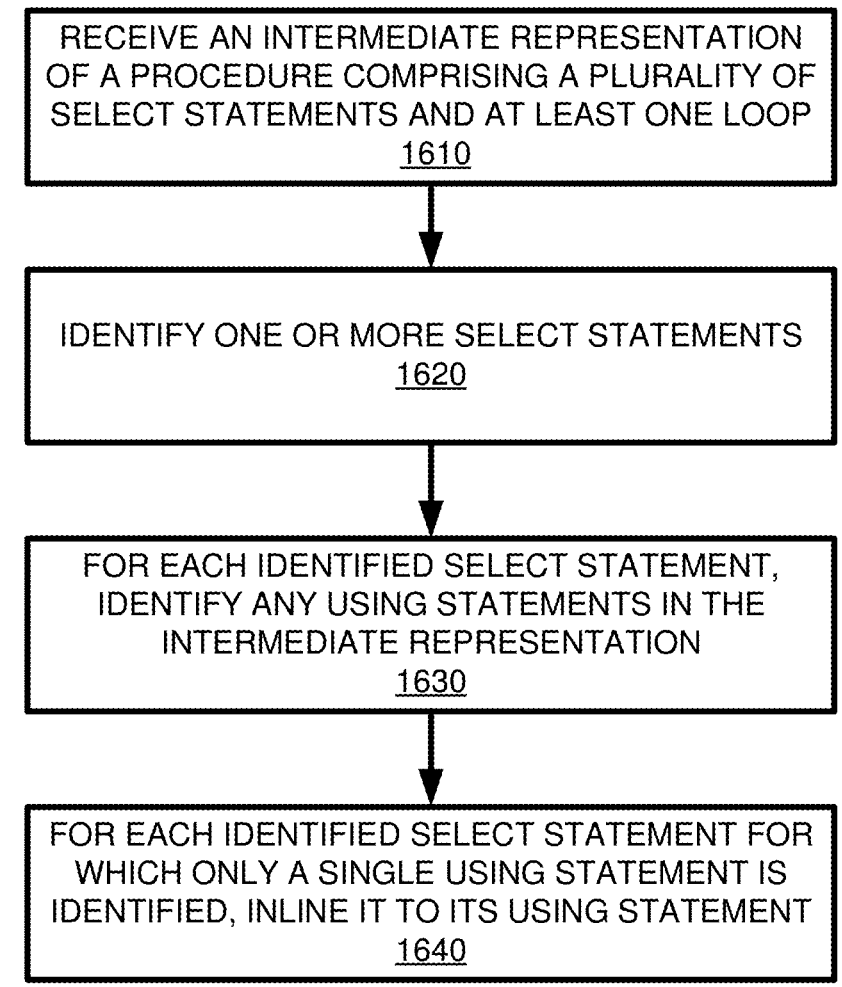
FIG. 16 is a flowchart of an example method for identifying statements that can be inlined, and inlining the identified statements.

FIG. 16 is a flowchart of an example method 1600 for identifying statements that can be inlined, and inlining the identified statements. The operations 1600 begin by receiving an intermediate representation of a procedure comprising a plurality of select statements and at least one loop 1610. In some cases, this may be an initial execution plan, while in other cases, it may be inlining may be performed on one or more of the alternative execution plans enumerated by, e.g., performing sink operations, as described herein. At 1620, one or more SELECT statements in the IP are identified. At 1630, for each SELECT statement identified at 1620, statements that depend on the statement, referred to herein as "using statements" may be identified. Using statements are further discussed in the detailed example provided herein. Query inlining may only be performed in cases where a single using statement exists. If multiple such statements exist, then inlining into one of the using statements may result in incorrect output. At 1640, for each identified SELECT statement for which only a single using statement is identified, the identified SELECT statement is inlined to its using statement.

In some instances, a plurality of statements each having only one using statement are identified, such as by the method described below, and each is inlined to its using statement. We note that generally, inlining a statement outside the loop with a statement inside the loop can cause unnecessary computation. However, we observe that benefits can derive from the SQL inlining, depending on the query optimization and the number of loop iterations, particularly in the examples described herein, which leverage sink operations and SQL inlining to provide a relative computing execution resource demand benefit, which may be determined using computing execution resource demand estimation, as further described herein.

Example 27—Example Application of Miming

In any of the examples herein, inlining can be applied to statements that have been sinked as described herein. For example, having sinked a query statement inside a loop, the query statement can possibly be inlined with another statement in the loop (e.g., proximate the sinked statement). Such query inlining can improve relative performance of the procedure (e.g., compared to a query execution plan candidate in which the query is not inlined).

Example 28—Example IR of Another Execution Plan

Figure 17:
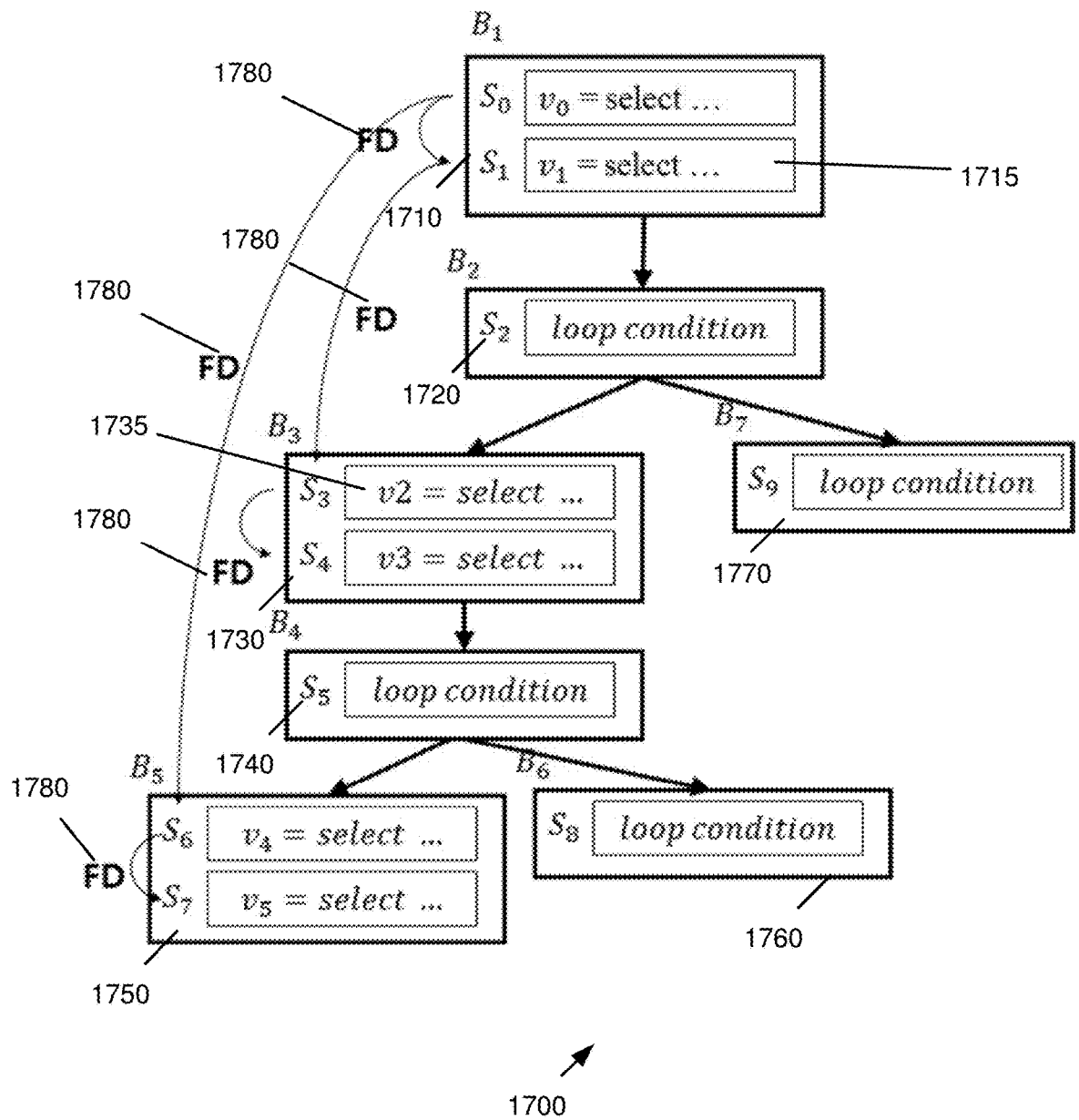
FIG. 17 is a block diagram of an original execution plan for another example procedure, overlaid with data dependencies.

FIG. 17 is a block diagram of an IR 1700 of another example execution plan for an example procedure, this time providing multiple loops and nested loops. Because no hoist or sink operations have yet been performed, it may also be referred to as an original execution plan.

Similar to IR 800, a first basic block 1710 is represented by a node in the graph and connected to a second node, first loop head block 1720. Also like IR 800, first loop head block 1720 further connects to two nodes. The first is a first loop body block 1730. The second, unlike the exit block in IR 800, is a first loop condition block 1770. Also unlike IR 800, the first loop body block 1730 itself further connects to a second loop head block 1740, which further connects to two nodes, a second loop body block 1750, and a second loop condition block 1760. This intermediate representation plan represents what are known as "nested loops," namely loops placed within other loops, as further discussed in the detailed example provided herein.

Within first basic block 1710 are a plurality of statements 1715, among them statement $s_1$. These statements are outside of both the first loop, inasmuch as they are not within first loop body block 1730, and the second loop, inasmuch as they are also not within second loop body block 1750. Within first loop body block 1730 are a plurality of statements 1735, among them statement $s_3$. This statement is considered within the first loop, inasmuch as it is situated within loop body block 1730. The second loop body block 1750 also contains a plurality of statements.

In addition to representing the various blocks and statements inside the blocks, IR 1700 also demonstrates a plurality of dependencies 1780 between and among the various statements. As described herein, these dependencies may be taken into account in generating a data dependency graph that shows the various dependencies between statements contained in an intermediate representation. Here, these dependencies are overlaid in IR 1700 as illustrated dependencies 1780. The specific dependencies in the illustrated example are flow dependencies, though it is to be understood that other dependencies—including direct and indirect dependencies—may exist, and so may impact the various operations that may be performed on the statements shown in IR 1700.

As with IR 800, various operations can be performed to achieve enumeration. For example, hoist and sink operations can be used to move statements within the IR, as further described herein. Additionally, query inlining may also be performed to maximize the benefit to computing system resources provided by the examples described herein.

Example 29—Example Initial Execution Plan

Figure 18:
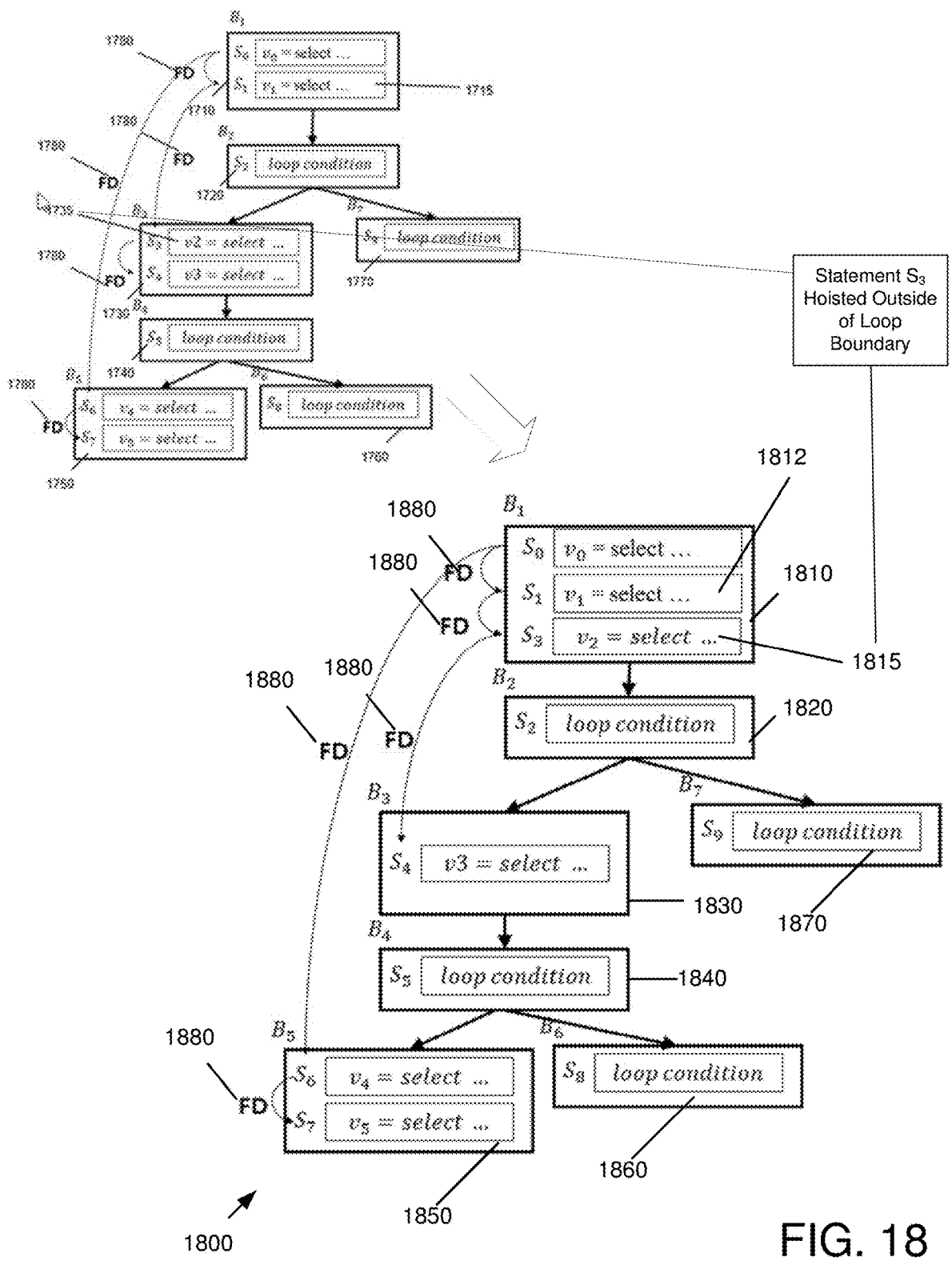
FIG. 18 is a block diagram of an initial execution plan after hoisting the hoistable statements in the original execution plan of FIG. 17.

FIG. 18 is a block diagram of an IR 1800 after performing a hoist operation on a statement from the intermediate representation of FIG. 17, which may be referred to as an initial execution plan.

Similar to IR 1700, a first basic block 1810 is represented by a node in the graph and connected to a second node, first loop head block 1820. First loop head block 1820 further connects to two nodes, a first loop body block 1830, and a first loop condition block 1870. The first loop body block 1830 itself further connects to a second loop head block 1840, which further connects to two nodes, a second loop body block 1850, and a second loop condition block 1860.

Within first basic block 1810 are a plurality of statements, among them statements $s_1$ 1812 and $s_3$1815. These statements are outside of both the first loop, inasmuch as they are not within first loop body block 1830 and also outside of the second loop, inasmuch as they are also not within second loop body block 1850.

In IR 1700, $s_3$ was previously inside the loop as statement 1735. However, as illustrated, it has been "hoisted" outside the loop so that it is now within first basic block 1810. In a hoist operation, the "hoisted" statement is typically appended behind the last statement in the block preceding the loop, here first basic block 1810. Within first loop body block 1830, only one statement, $s_4$, remains following the hoist.

The second loop body block 1850 also contains a plurality of statements unaffected by the hoist.

It is noted, that despite the hoist, the dependencies 1880 between and among the various statements remain unchanged. It is these dependencies that can now be taken into consideration (in some cases with additional dependencies not shown) in enumerating one or more alternative execution plans, such as by generating a plurality of sink subgraphs, as further described herein.

Example 30—Example Alternative Execution Plan

Figure 19:
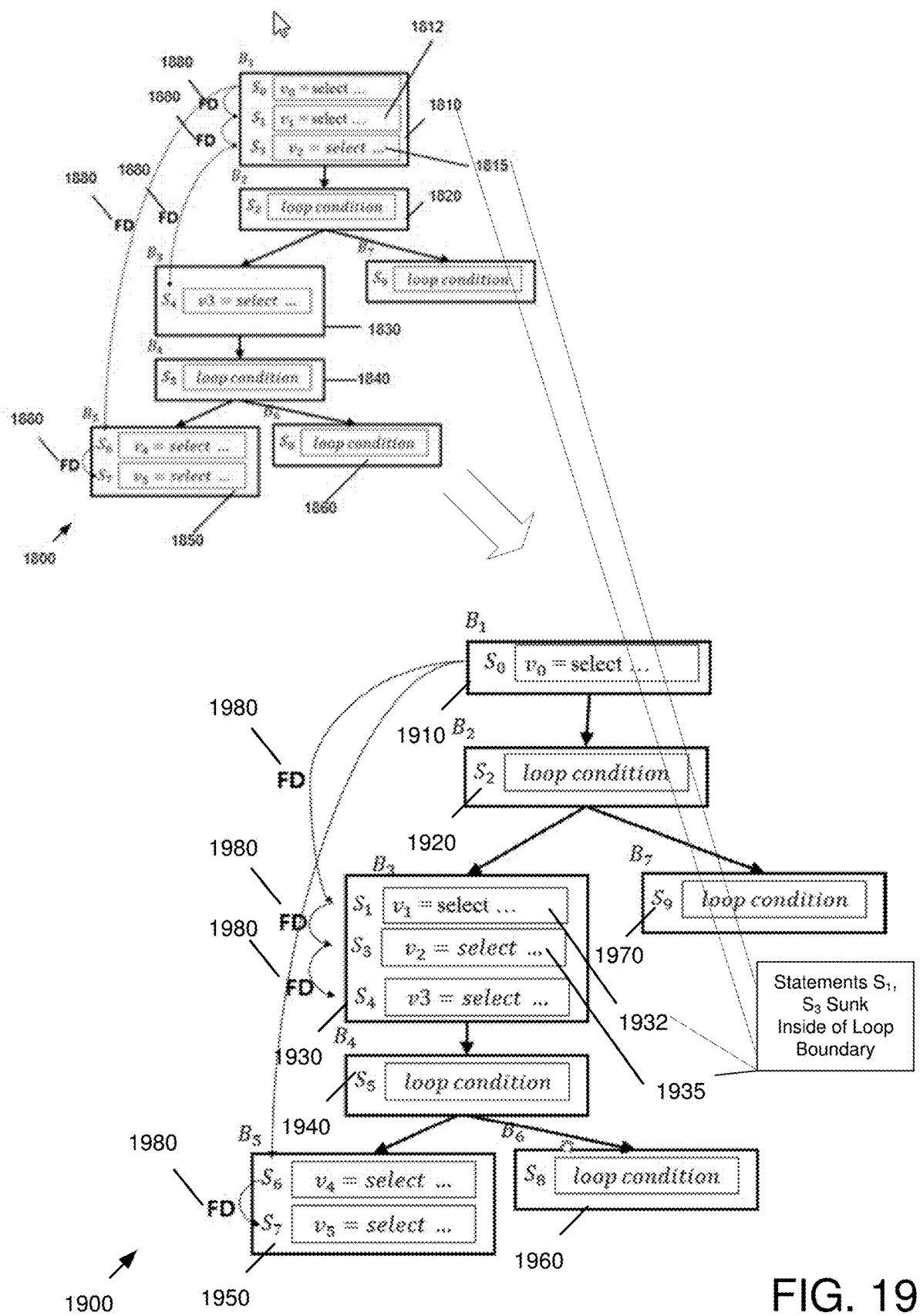
FIG. 19 is a block diagram of an alternative execution plan after sinking the sinkable statements in the initial execution plan of FIG. 18.

FIG. 19 is a block diagram of an IR 1900 after sinking a plurality of sinkable statements from the initial execution plan in FIG. 18. IR 1900 may be referred to as an "alternative execution plan." While a full intermediate representation is provided in the illustrated example, it is to be understood that an alternative execution plan need not represent the entire intermediate representation, but may, for example only include those statements and/or loops that are affected by a given operation, such as the sink operations described herein.

Similar to IR 1800, a first basic block 1910 is represented by a node in the graph and connected to a second node, first loop head block 1920. First loop head block 1920 further connects to two nodes, a first loop body block 1930, and a first loop condition block 1970. The first loop body block 1930 itself further connects to a second loop head block 1940, which further connects to two nodes, a second loop body block 1950, and a second loop condition block 1960.

Within first basic block 1910, there are no longer a plurality of statements, but merely a single statement so. Previously statements $s_1$ 1812 and $s_3$ 1815 were situated outside of the first loop, but, as illustrated, they have now been sinked inside the first loop body block 1930 as statements 1932 and 1935, respectively.

In a sink operation, the "sinked" statements are typically placed before—and where possible inlined with—the statements inside the loop that use them, in this case, the other statements within first loop body block 1930. In some cases, only one such "sinkable" statement may exist, while in other cases, such as this one, there may be two or more such statements. In some cases, there may be multiple options for performing sink operations, and a process may be performed to enumerate all such alternatives, such as preparing sink subgraphs, as further described herein.

The second loop body block 1950 also contains a plurality of statements unaffected by the sink.

It is noted, that despite the sink, the dependencies 1980 between and among the various statements remain unchanged.

Example 31—Example Enumerate Sink Subgraph

Figure 20:
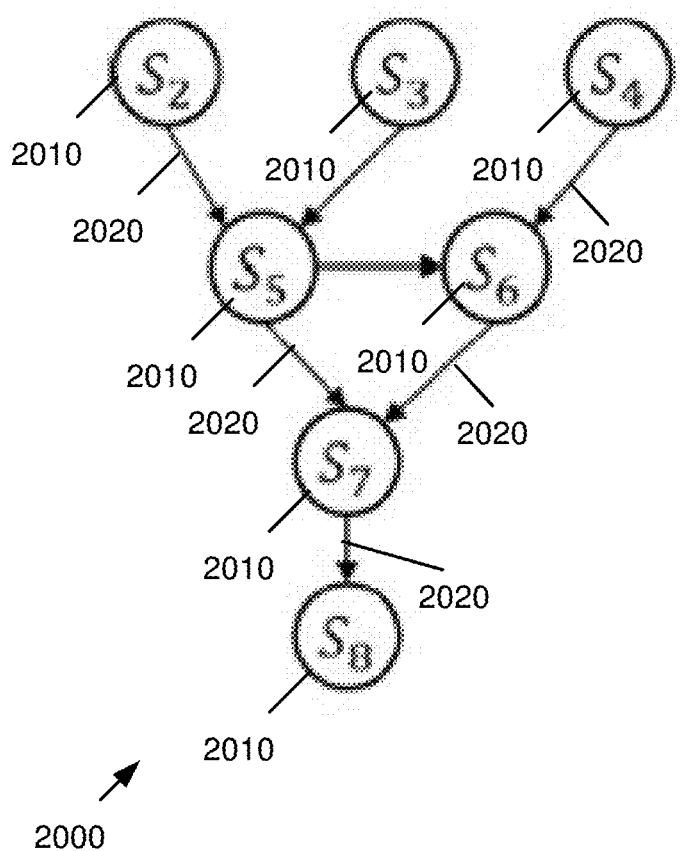
FIG. 20 is a block diagram illustrating an example sink subgraph for the example procedure illustrated in the original execution plan of FIG. 8.

FIG. 20 is a block diagram 2000 of an example sink subgraph (SG) 2000 for the exemplary procedure represented by IR 800. The sink subgraph (SG) is a structure for selecting the queries to sink in consideration of their relative data dependencies, as further described herein, which may be represented in a data dependency graph (DDG). The sink subgraph may be generated, for example, based on identifying all sinkable statements of the DDG (not shown) for IR 800. The sinkable statements $S_2$, $S_3$, $S_4$, $S_5$, $S_6$, $S_7$, and $S_8$ in IR 800 are shown as nodes 2010 connected by directed edges 2020 within SG 2000, and may be extracted from SG 2000, and sinked into the loop, as further described herein. Directed edges indicate which statements "use" (e.g., rely on the output of) other statements. So, an arrow pointing from a first statement X to a second statement Y indicates that Y uses (e.g., relies on) X.

Sink subgraphs can be enumerated from the DDG by finding a first sinkable query (which may be a loop-invariant query upon which a given statement within a loop relies), and then extending edges to those other sinkable statements that are related thereto. This process may be repeated recursively to enumerate all sink subgraphs until there are no more edges to expand. Sink subgraphs are described further herein in the detailed example provided below.

In order to discover all sink subgraphs, a pattern growth approach such as is used in frequent subgraph mining may be used, extending the subgraph by adding one edge at a time in depth first order, and enumerating the other sink subgraphs until all potential subgraphs have been enumerated for a given loop. For a given loop, a plurality of sink subgraphs may exist, depending on the dependencies between and among the various statements contained therein. In such cases, a plurality of query execution plans may be generated to reflect each of the separate sink subgraphs.

In order to find all sink subgraphs for a given IR, one can find all the loop body blocks by using in-order traversal and build a data dependency graph. Then for each loop body block l, all sink subgraphs are enumerated. The process may then be repeated for multiple loops, as needed. These various sink subgraphs can then be evaluated, to determine which of the sink operations represented therein will provide the greatest benefit to computing resources, as described herein.

Figure 21:
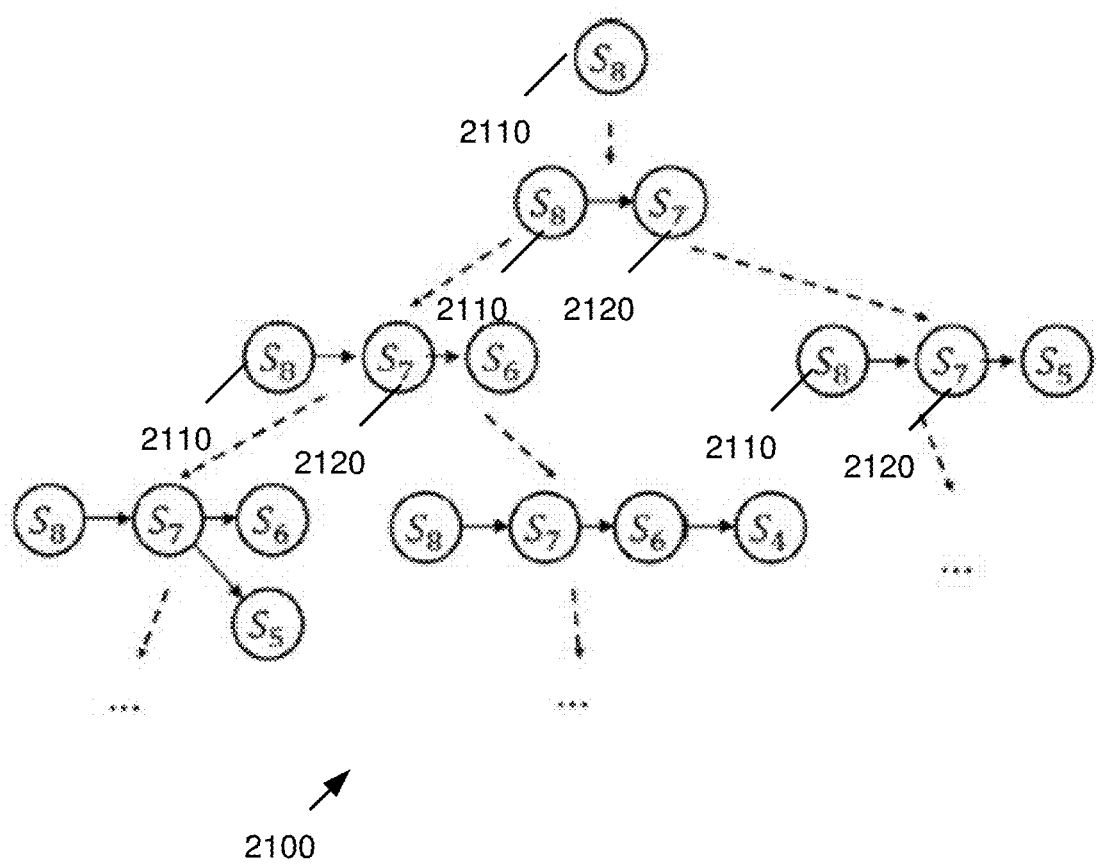
FIG. 21 is a block diagram illustrating an example search space tree to discover the sink subgraphs for the example procedure illustrated in the original execution plan of FIG. 8.

FIG. 21 is a block diagram of an example search space tree 2100 which may be used to discover all sink subgraphs for the example procedure discussed above. In the illustrated example, an enumeration algorithm can start searching from the node 2110 containing statement $S_8$ and extend one edge to its neighbor node 2120 $S_7$ to access a corresponding statement. Similarly, the algorithm continues to traverse from one node to another until it visits a node that has no neighbor. Once that process is complete, a sink subgraph has been identified, which in the illustrated example, is the sink subgraph 2000 illustrated in FIG. 20.

Example 32—Example Relative Computing Execution Resource Demand Estimation

Figure 22:
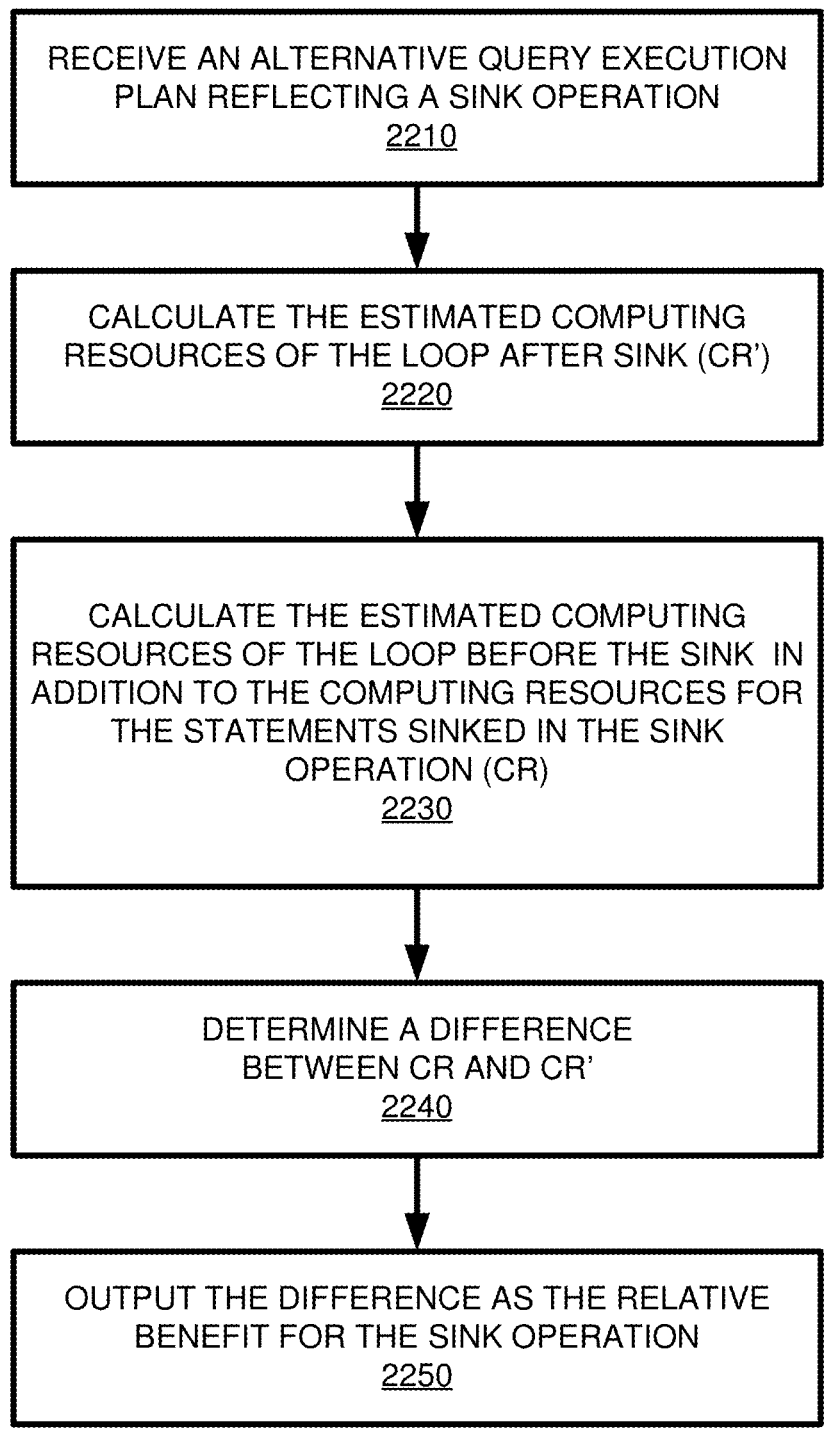
FIG. 22 is a flowchart of an example method for calculating the relative benefit of alternative execution plans

FIG. 22 is a flowchart of an example method 2200 for estimating relative computing execution resource demand for a given alternative query execution plan. The operations 2200 begin at 2210 by receiving an alternative query execution plan reflecting a sink operation. At 2220, the estimated computing resources (CR') for a given loop into which a sink has been performed are calculated. This step may be performed, for example, by multiplying the resources used for a given iteration of a loop, by the number of iterations for the loop. At 2230, the estimated computing resources (CR) for the given loop prior to performing the sink is calculated (such as by the example calculation described in step 2220 above) and added to the estimated computing resources for the statements outside the loop that were sinked. At 2240, the difference (if any) between CR and CR' is determined. This difference can be considered the relative benefit to computing resources for the sink operation in question. At 2250, this relative benefit can be returned as an output for the method.

While in the illustrated example, this method is performed on a sink operation, it is to be understood that a similar approach could be used to determine relative computing benefit for other exemplary operations described herein, such as a hoist or query inlining.

Example 33—Example Optimal Execution Plan Determination

In selecting an optimal query execution plan, the relative benefit in terms of computing execution resource demand between or among various alternative execution plans may be compared. In some cases, the optimal plan can simply be identified as the plan using the minimal amount of computing resources, which can in some cases be the execution plan having the greatest relative benefit to computing execution resource demand from among the various alternatives, such as the relative computing execution resource demand benefit identified in the example computing execution resource demand estimation 2200, above. The terms "optimal," "optimized," etc. as used herein do not necessarily mean a theoretically best possible alternative, but may simply be the better of two alternatives, or the best among a finite number of enumerated alternatives.

Figure 23:
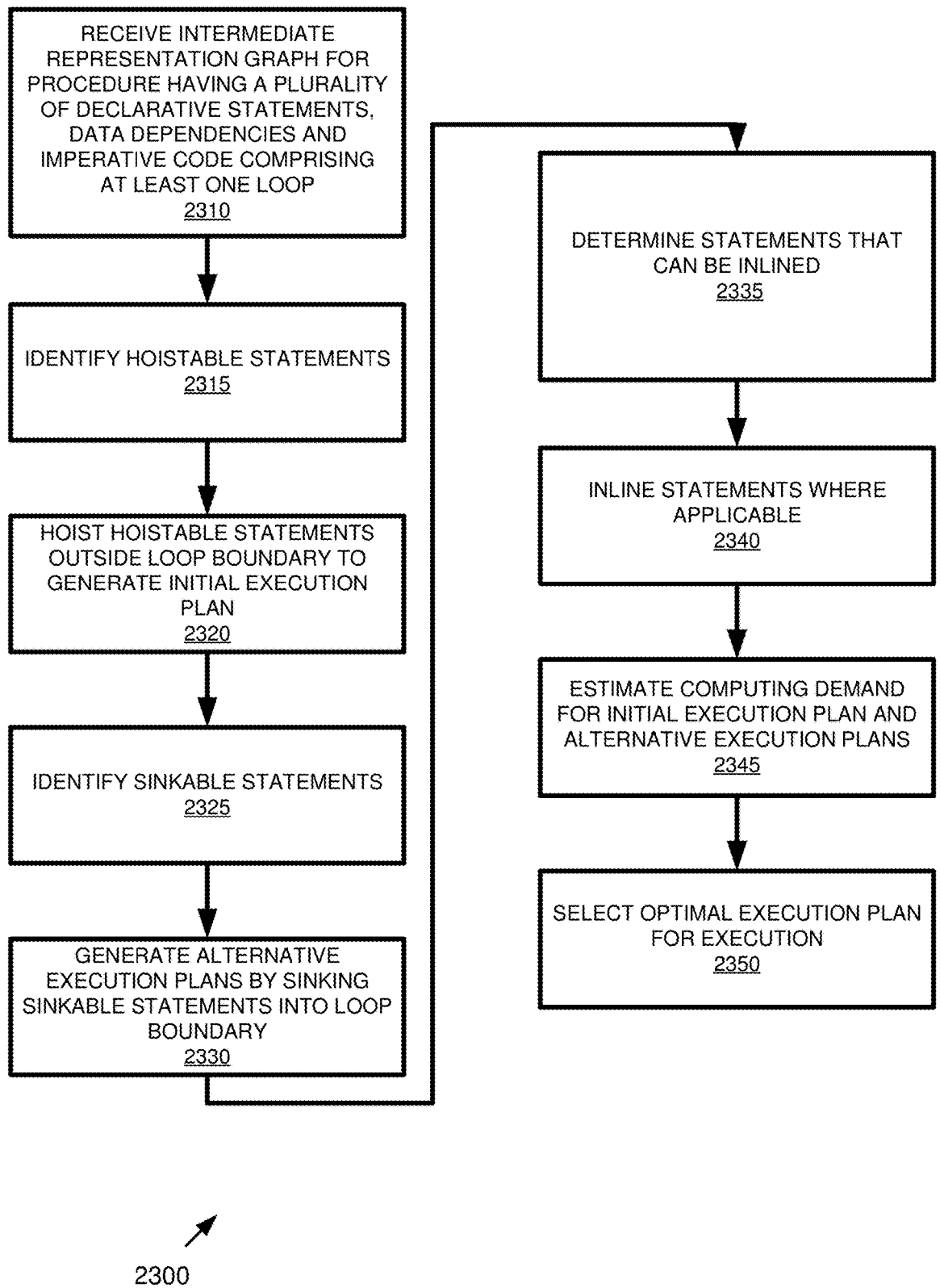
FIG. 23 is a flowchart of another example method of optimizing a procedure having both declarative query constructs and imperative code.

Example 34—Another Example Method Implementing Optimization of a Procedure Having Both Declarative Query Constructs and Imperative Code FIG. 23 illustrates another example of operations 2300 that can be carried out to optimize a procedure having both declarative query constructs (e.g., query statements) and imperative code.

The operations 2300 begin at 2310, such as by receiving an intermediate representation graph depicting a computer-implemented procedure comprising a plurality of statements. In some cases, at least one of the plurality of statements has data dependency on another statement among the plurality of statements, and wherein the procedure further comprises a loop.

At 2315, "hoistable" statements are identified, which can comprise identifying at least one statement among the plurality of statements that is within a boundary of the loop that can be moved outside of the loop boundary, as further described herein. At 2320, the statement(s) identified in 2315 are hoisted outside of the loop boundary to generate an initial execution plan reflecting the hoisting. In certain cases, more than one initial execution plan can be generated, where multiple hoisting operations are possible, as further described herein.

At 2325, "sinkable" statements are identified, which can comprise identifying at least one statement among the plurality of statements that is outside a boundary of the loop that can be moved inside of the loop boundary, as further described herein. At 2330, alternative execution plans are generated representing sinking each of the statement(s) identified in 2325 into a loop, i.e., within the loop boundary. At 2335, it is determined which of the plurality of statements can be inlined into other statements, and, where applicable, inlining is performed at 2340.

At 2345, an estimate of the computing execution resource demands for executing the respective alternative execution plans is generated. At 2350, an optimal execution plan for the input procedure is selected for execution, such as by comparing the estimates generated at 2345 to determine an execution plan out of the initial execution plan and alternative execution plans with a lowest estimated computing execution resource demand. In some cases, this optimal execution plan may subsequently be compiled and executed, as further described herein.

Example 35—Example Compiling Procedure

In any of the examples herein, the input procedure can be compiled according to the selected query execution plan. In practice, the selected query execution plan can provide a general outline of where statements are to be placed when performing compilation rather than a complete query execution plan. The actual query execution plan can then be constructed based on such an outline and/or the original input procedure.

Compilation can be done in a variety of ways. For example, actual machine code or bytecode can be generated for execution on a real or virtual machine, a lower level language can be generated for further compilation, or higher level instructions for interpretation can be generated. Just-in-time and other compilation scenarios can be supported.

Example 36—Example Executing Procedure

In any of the examples herein the compiled procedure can then be executed in a database environment to achieve the calculations therein (e.g., a result is generated). Because the procedure has been optimized, the computing resources consumed by such an execution are reduced compared to the original, unoptimized procedure. Examples of resource utilization improvement are shown below.

Example 37—Example Detailed Implementation

In order to provide further detail on the concepts disclosed herein, a more detailed example is provided. The techniques described herein can be applied to any one or more of the other examples described herein.

In modern enterprise applications, data analysis includes iterative tasks with complex analytical queries. Stored procedures are used to represent those complex analytical queries using the control flow logics. Optimizing the complex procedures requires understanding imperative programming language as well as declarative SQL query language. Therefore, a unified optimization technique considering both the program optimization technique and the SQL optimization technique is essential for achieving an optimal query performance. A new notion of query motion allows movement of SQL queries into and out of a loop boundary, which is different from the existing loop-invariant code motion technique that moves code only outside the loop. Then novel unified optimization techniques are described based on the query motion for efficient iterative query processing in the stored procedure. One can enumerate the various possibilities for query motion to generate alternative execution plans, and exploit a new computing execution resource demand (sometimes called "cost") model that considers the quality of the execution plan for analytical queries and loop iterations to select an optimal query execution plan. Experimental results using a standard decision support benchmark show that the cost-based query motion algorithm achieves high efficiency by up to seven times compared with the existing loop-invariant code motion algorithm.

Business logic in relational database management systems (RDBMs) is represented as a combination of imperative programming constructs and declarative structured query language (SQL) queries. To support the representation, many RDBMS provide the stored procedures or User-Defined Functions (UDFs) in different languages such as PL/SQL, SQL-Script, and T-SQL. Traditionally the stored procedures and UDFs have usually been used for data manipulation in online transaction processing (OLTP) systems, and thus the procedure optimization mainly focus on OLTP workloads, e.g. TPC-C, with relatively simple SQL queries, data manipulation languages (DMLs), and imperative logic.

Since the use of complex analytical queries with imperative constructs in a single procedure is becoming popular, however, the processing for the declarative SQL query and imperative procedures poses a vital optimization issue. A procedure of a modern business application is often too complex to optimize. For example, in a typical application, the complexity of a SQLScript procedure is extremely high. For example, a Material Requirement Planning (MRP) procedure can involve about 100 join operations, 100 group by operations, and 2 loops in a single procedure.

The traditional optimization approaches for a stored procedure have been isolated and studied separately. While declarative SQL optimization has been improved, imperative code optimization has relied on traditional compiler based optimization, e.g. constant propagation and dead-code elimination. Some research has focused on converting imperative codes to declarative SQLs in order to leverage declarative optimization. While these approaches provided some performance improvements, the imperative code and queries that can be changed using transformation are limited. Thus a need exists for improved procedure optimization, particularly for computer-implemented procedures comprising analytical queries with imperative constructs.

In order to optimize the declarative SQLs in a procedure, a stored procedure can provide a feature called SQL inlining that places queries with data dependencies within a single query, or "inlines" them. SQL inlining can improve the quality of the query plan by applying more query optimization rules. These extensions allow experts to create and manage complex queries by dividing them into multiple smaller and understandable queries. The results of the divided queries are assigned to table variables and the divided queries are combined through these table variables to have the same semantics as the original complex queries. However, these extensions have not previously been applied to imperative procedure code with loop and conditional logic.

In this disclosure, SQL inlining is advantageously applied to imperative procedure code with loop and/or conditional logic. In order to do so, an optimization technique can consider both the traditional programming optimization and the execution plan of the inlined query. SQL inlining poses challenges when applied to a cross optimization technique considering the declarative SQLs and the imperative procedure codes. And, it can be difficult or time consuming for programmers to manually rewrite the imperative procedure code mixed with SQL queries to improve the execution plan of queries. Therefore, one can focus on providing a solution that focuses on loop optimization within the imperative procedure code, since the loop in a procedure occupies a large portion of the overall computing execution resource demand of the procedure.

Loop invariant code motion optimization improves the performance of a procedure by moving loop-invariant code contained within a loop outside that loop. However, it has been determined that the performance of a procedure can also be improved in some cases when a query outside the loop is inlined to a query inside the loop. While this approach can seem counter-intuitive given that moving a procedure outside a loop inside a loop can result in that procedure being iterated numerous times, which might seem to be less efficient, SQL inlining into the analytical queries can enhance the quality of the execution plan of that inlined query in some cases, which are described in more detail herein. One can observe the following scenarios while considering the motion of a loop invariant code:

i. A query outside a loop is moved inside the loop. We call this motion a sink. If a query outside a loop is inlined with a query inside the loop, the execution plan quality of the inlined query is improved. For example, if there is a selective join operation in a query inside a loop, the join operation reordering rule is applied to reduce the cost of a join operation of the query outside a loop.

ii. A loop invariant query inside a loop is moved outside the loop. One can call this motion a hoist. If the loop invariant query is moved outside of the loop and inlined with the outside query, the execution plan quality of the query outside a loop is improved. Moreover, this query motion improves the performance of the loop by removing the redundant iterative executions for the loop invariant queries.

iii. Execution plan quality of the query in a loop is improved by inlining the loop invariant query with other queries inside the loop.

Described herein is a new loop code motion optimization technique that considers all the above query motion scenarios. In this disclosure, we propose optimization techniques for efficient iterative query processing in the stored procedure considering each of these query motion scenarios. One can describe a new computing execution resource demand model (e.g., to estimate demand) that considers the query execution cost and the loop cost of a query processor to determine the statements for hoisting and sinking based on their costs. One can discover all the statements for hoisting and sinking by using a pattern growth approach. The experimental results based on real-world examples from the TPC-DS benchmark show significant improvements in terms of execution time composed with the state-of-the art work.

In order to improve the existing programming optimization techniques, we need to analyze the control flow and the data dependency of a procedure. Data dependency refers to how the execution of a statement affects the execution result of another statement. In this disclosure, one can extend the SQL structure to the intermediate representation (IR) structure used in the traditional compiler to analyze the control flow and the data dependency on the procedure. One can use this IR structure—sometimes referred to herein as an IR graph—as an execution plan for a procedure.

Table 1 describes some notations which are frequently used in this disclosure:

TABLE 1

Notations

| Notation | Description |
| --- | --- |
| B | a basic block |
| s, l | a statement and a loop, respectively |
| $B_s$ | a basic block that contains statement s |
| $B_l$ | a loop body block that contains loop l |
| IG | a primary execution plan for a procedure |
| $IG^0$, $IG^i$ | an initial and alternative execution plan for IG, respectively |
| $v_{si}$, $e_{si}$ | a variable and an expression for $s_i$, respectively |
| SOL(l) | a set of statements outside the loop l |
| SIL(l) | a set of statements inside the loop l |
| DDG | a data dependency graph |
| H | a set of hoistable statements |
| S | a set of sinkable statements |
| HS(l) | a set of hoistable statements for loop l |
| SS(l) | a set of sinkable statements for loop l |
| $s_1 \xrightarrow{FD} s_2$ | the flow dependence from $s_1$ to $s_2$ |
| $Cost_q(s)$ | the query estimation cost for s |
| Cost(S, l) | the estimation cost for S and l |
| B(S, l) | the benefit measurement for S and l |

Intermediate Representation (IR) of an Execution Plan for a Stored Procedure

In this section, one can formalize the notions used in the intermediate representation for a stored procedure. A basic block B is a straight-line statement sequence $(s_{i1}, s_{i2}, \ldots s_{in})$ with no branches in except at the entry and no branches out except at the exit. An assignment statement s is represented as a 2-tuple $(v_s, e_s)$, where $e_s$ is an expression and $v_s$ is a variable to assign the result of $e_s$. If $e_s$ is an expression for a select query, the result of the query execution is assigned to $v_s$. In this case, the statement is called the SQL assignment statement, and $v_s$ is called a table variable. If $e_s$ has no result, $v_s$ has a 0 value.

An IR graph represents the control flow for the statements in a procedure. The IR graph IG is a directed graph, which is represented as a 4-tuples (B,E,L,l), where B represents a set of basic blocks, $E \subseteq N \times N$ represents a set of edges, L represents a set of labels, and l: $N \cup E \rightarrow L$ represents a function for assigning the labels to the nodes and edges. Each node $n \in N$ represents a basic block B. The edge for the pair of vertices $n_i$ and $n_j$ represents the control flow between the pair of basic blocks $B_i$ and $B_j$. In order to simplify all data dependencies, an IR graph is represented as single static assignment (SSA) form, which requires that each variable is assigned exactly once.

The IR graph also represents the imperative procedure code such as conditional code and loop code. A conditional code is represented as three basic blocks: a conditional block, a true block, and a false block. A conditional block has a logical statement and a branch statement. A logical statement contains a logical operator and it assigns a true or false value to a variable. A branch statement indicates the basic block to be executed next according to the logical variable. To represent the control flow, a conditional block is connected to a true block and a false block on the IR graph. A loop code is represented as two basic blocks: a loop head block, a loop body block, which can be referred to herein as a loop boundary or "inside the loop" (as opposed to code outside the loop body block, which can be referred to as "outside the loop boundary" or "outside the loop"). The loop head block has a logical and a branch statement to decide the number of iterations. To represent the control flow, the loop head block is connected to the loop body block and the other blocks on the IR graph. The loop body block is also connected to the loop condition block.

Procedure 1 (An Example SQLScript) (statement numbers ($s_0$) referenced below are shown in [brackets]):

|  |  |  |
| --- | --- | --- |
|  | 1 | CREATE PROCEDURE QUERY_23(IN _year INTEGER, IN min_sup INTEGER, IN k INTEGER, OUT result "TPC".res) AS BEGIN |
| [$s_1$] | 2 | DECLARE i INTEGER; |
| [$s_2$] | 3 | sales = SELECT ss_item_sk, ss_sold_date_sk FROM store_sales; |
| [$s_3$] | 4 | items = SELECT i_item_desc, i_item_sk FROM item; |
| [$s_4$] | 5 | dates = SELECT d_year, d_date, d_date_sk FROM date_dim; |
| [$s_5$] | 6 | sales_items = SELECT ss_item_sk sk1, i_item_desc, i_item_sk FROM :sales, :items WHERE ss_item_sk = i_item_sk; |
| [$s_6$] | 7 | sales_dates = SELECT ss_item_sk sk2, d_year, d_date FROM :sales, :dates WHERE ss_sold_date_sk = d_date_sk ; |
| [$s_7$] | 8 | sales_items_dates = SELECT d_year, i_item_desc, i_item_sk, d_date FROM :sales_items, :sales_dates WHERE sk1 = sk2; |

-continued

```
[s_8]   9  FOR i IN 0 .. (:k-1) DO
[s_9]  10  agg_items = SELECT d_year, i_item_desc,i_item_sk,
               d_date,count(*) cnt FROM :sales_items_dates
               GROUP BY i_item_desc,i_item_sk,d_date,d_year;
[s_10] 11  target_items = SELECT i_item_sk, i_item_desc, d_date,
               cnt FROM :agg_items WHERE d_year in (:_year+(:i
               *2), :_year+(:i*2+1));
[s_11] 12  freq_items = SELECT i_item_desc, i_item_sk, d_date,
               sum(cnt) cnt FROM :target_items GROUP BY
               i_item_desc, i_item_sk, d_date HAVING
               sum(cnt) > :min_sup;
[s_12] 13  result = SELECT * FROM :result UNION SELECT * FROM :
               freq_items;
       14  END FOR;
       15  END;
```

FIG. 8 represents an execution plan of the procedure for Procedure 1, which can be referred to as an "original execution plan." Since the statements from $s_i$ to $s_7$ do not have a branch, these statements are assigned to a base block $B_1$. A logical statement $s_8$ in $B_2$ is inserted to the loop condition block $B_2$ to check if the loop condition is i<k−1. The statements $s_9$, $s_{10}$, $s_{11}$, and $s_{12}$ (line 10 and 13 queries in Procedure 1) are added to the loop body block $B_3$. Then, we add an exit statement to $B_4$ to terminate the program since no more statement is left to execute after loop execution. To represent the control flow for the loop, $B_2$ is connected to both $B_3$ and $B_4$.

Data Dependency Analysis

Data dependencies among the queries should be considered for performing the query motion and inlining. The data dependency graph (DDG) solves this reordering problem. A DDG is a directed graph which is represented as a 4 tuple (V, E, L, l), where V represents a set of nodes, E⊆V×V is a set of edges, L is a set of labels, and l: V∪E→L represents a function for assigning labels to the nodes and the edges. Node v∈V represents either a statement or a table or an input parameter. If there is a data dependency between a pair of nodes $v_i$ and $v_j$, we connect that pair of nodes to an edge e. The direction and the label of e represent the data dependency direction and type, respectively. A data dependency graph can include a number of different types of data dependencies such as flow dependency (FD, Read After Write), anti dependency (AD, Write After Read), output dependency (OD, Write After Write), and input dependency (ID, Read After Read). Dependencies that take into account the SQL statements must also be expressed in the DDG since the stored procedures contain the SQL queries as well as the arithmetic expressions. Therefore, we connect the edges by considering the read/write operation of the query and the table variable in the query.

Our proposed loop optimization algorithm performs the loop invariant code motion and the SQL statement inlining by considering only read and write data dependencies. We use a + symbol following the dependency type over an arrow to denote that the DDG contains a path from one statement to another having only edges with that type of dependency. For example, $$s_1 \xrightarrow{FD} s_2 \xrightarrow{FD} s_3, s_1 \xrightarrow{FD+} s_3$$

refer to a DDG containing a path from $s_1$ to $s_3$ having only edges with the flow type dependency.

SQL Statement Inlining

SQL Statement Inlining enhances the quality of the execution plan for an inlined statement. If a query is executed independently, the query optimization is performed considering only each relational operator. But if multiple queries are inlined, query optimization is performed in a wider search space because many operators can be included. Various optimization rules such as the join reordering, predicate push down, and group by simplification can be applied over the inlined statement.

If two SQL statements have a flow data dependency, they can be inlined and executed as a single query. The inlined statement can be represented by using the common table expression (CTE) statement. We define SQL statement inlining as follows.

Definition 1. (SQL Statement Inlining)

Let $s_1=(v_1, q_1)$ and $s_2=(v_2, q_2)$ be two statements. SQL Statement Inlining substitutes the reference of $v_1$ in $q_2$ to the $q_1$ if and only if $$s_1 \xrightarrow{FD+} s_2.$$

Then we define $s_2$ as an inlined statement.

FIG. 15 represents all the execution plans of $v_1$ and $v_2$ for Procedure 2. We assume that all statements in $B_1$ and $B_3$ in FIG. 15 are inlined with $s=(v_1, e_1)$ and $\acute{s}=(v_2,e_2)$ respectively. The group-by operation is represented by Γ. Execution plan s 1510 and execution plan $\acute{s}$ 1520 show the optimized execution plans of s and $\acute{s}$, respectively. Inlined execution plan 1530 shows the optimized execution plan for the SQL statement of inlined $v_1$ and $v_2$. Since $v_2$ has a predicate of $\sigma d_{year}=2000 \hat{} d_{year}=2001$ for the date_dim table among the tables accessed by the query of $v_1$, $\sigma d_{year}=2000 \hat{} d_{year}=2001$ operation is pushed down to $\bowtie_{ss\_item\_sk=i\_item\_sk}$ to create a more optimized query plan.

Example Procedure 2 v1=Select count(*) cnt, d.d_year, d.d_date,
    it.i_item_sk, it.i_item_desc from store_sales_ss,
    date_dim d, item it where ss.ss_sold_date_sk=
    d.d_date_sk and ss.ss_item_sk=it.i_item_sk and
    d.d_year=2000 and d.d_year=2001 group by
    d_year, d_date, i_item_sk, i_item_desc;
v2=Select v1.cnt, v1.d_year, v1.d_date,
    v1.i_item_sk, v1.i_item_desc from:v1 v1
    where v1.d_year=2000 and v1.d_year=2001
    group by v1.cnt, v1.d_year, v1.d_date,
    v1.i_item_sk, v1.i_item_desc having sum(cnt)=3;

During the SQL inlining for $s_1=(v_1, e_1)$ and $s_2=(v_2, e_2)$, we need to check for the data dependencies between the two statements. If either an update or an insert or a delete statement is performed on the tables in $s_1$ or $v_1$ in another statement before reading the $s_1$ statement, the query $e_1$ in $s_1$ is executed prior to the statement with the write operation. Therefore, if a query is executed by inlining $s_1$ into $s_2$, the query result is changed. For example, suppose an insert statement inserts some rows to the store_sales table before executing $v_2$ in Procedure 2. If $v_1$ is inlined to $v_2$, the query result of $v_2$ is not valid since the store_sales table is updated before executing $v_1$. If the statements $s_1$ and $s_2$ are the select statements, a path exists between the two nodes corresponding to $s_1$ and $s_2$ in the data dependency graph. If the statements in that path do not have the write dependencies on other statements, we apply the SQL statement inlining We note that inlining a statement outside the loop with a statement inside the loop can cause unnecessary computation. However, we observe that benefits can derive from the SQL inlining, depending on the query optimization and the number of loop iterations. Therefore, we do not inline the outer loop statements into the inner loop SQL statements. Rather the query with benefit is moved to inside of the loop by query motion and SQL inlining is applied. We discuss this issue in more detail below.

Query Motion

Since an analytical query consists of a large number of relational operators, the query execution plan greatly affects the execution time. SQL statement inlining provides an opportunity to further apply optimization rules by inlining the queries with data dependencies into a single query. In order to take advantage of SQL statement inlining, queries with dependencies should be placed within the loop together. On the other hand, idempotent queries in the loop (i.e., queries whose results are not dependent upon the iterations of the loop) have inefficiency due to redundant iterations. Therefore, a sophisticated query movement algorithm is required that improves the quality of the query execution plan by SQL statement inlining while reducing the repetition of queries in the loop.

In this section, we first define the notion of query motion considering both SQL and program optimizations. By using these definitions, in the following sections, we propose a novel algorithm that finds the execution plan with the highest benefit. The benefit of the execution plan is estimated by the benefit from the query motion based on the query estimation cost.

The query motion methods, hoist and sink changes the query execution plan due to the SQL statement inlining We enumerate the execution plan by performing the hoist or sink motion and optimize the analytical queries by performing the SQL statement inlining Hoist Motion In this section, we extend the traditional loop-invariant code motion technique so that it can be used with SQL statements. Given a loop l, the loop-invariant statements can be hoisted out of l if they have idempotence for l. We formulate loop-invariant statement as the following definition. Let $B_l$ be the loop body block for the loop l and $B_p$, be the previous basic block of the loop head block.

Definition 2. (Loop-Invariant Statement)

Let l be a loop and let $s=(v_s, e_s)$ be a SQL statement. Then we define s as loop-invariant statement for l if and only if the following statements are true. Here T is a set of all tables accessed in the FROM clause of $e_s$.

$e_s$ does not have any flow or input dependency to a statement in l.

$\forall t \in T$, statement s' referring $t \in B_l$ is loop-invariant.

Definition 3. (Hoistable Statement)

Let l be a loop and let $s=(v_s, e_s.)$ be an SQL assignment statement. The hoistable statement s is a loop-invariant statement inside of the loop body block $B_l$.

We formulate the hoist motion for a set H of hoistable statements. Given a set H of hoistable statements in $B_l$ and an execution plan IG, the hoist motion moves each $s \in B_l$ to $B_p$ is a preceding block of $B_l$, and is denoted as HM (H, IG). We append s behind the last statement in $B_p$.

FIG. 9 represents one of the possible execution plans by a hoist motion for Procedure 1. $s_9$ is the loop-invariant statement. $s_9$ is hoisted to behind of $s_7$ in $B_l$.

Sink Motion

Definition 4. (Sinkable Statement)

Let l a loop and let s be a SQL assignment statement. The statement s is sinkable if and only if $s \notin B_l$ and $$\exists s' \in B_l, s \xrightarrow{FD+} s'.$$

We formulate the sink motion for a sinkable statement. Given a set S of sinkable statements, a loop body block $B_l$, and an execution plan IG, the sink motion moves each statement s in S into Bl. s is inserted immediately before the corresponding depending statement in $B_l$.

Given a loop l, we denote a set of hoistable statements and a set of sinkable statements as HS(l) and SS(l), respectively. Let SOL(l) and SIL(l) be the set of statements outside the l and the set of statements inside the l, respectively. FIG. 12 shows the one of the possible execution plans by a sink motion for Procedure 1. $s_2, s_3, \ldots,$ and $s_7$ are sinkable statements because all such statements have a flow dependencies for $s_9$ in the loop.

Let $IG^i$ be the execution plans with and without applying the query motion for all statements in H and S. We enumerate alternative execution plans for possible combinations in H and S and select the execution plan with the highest benefit.

The query motion methods depend on the position of statement in the user-written procedure. For example, if the user writes a loop invariant query outside the loop, the query can sink to the loop. In the opposite case, the query can hoist outside a loop. In order to simplify the problem of moving the query, the primary IR graph, which is created based on the user-written procedure is changed to the normalized form regardless of the location of the statement in the procedure.

The hoisting of a loop-invariant statement outside the loop does not affect the result of a procedure since the output of a loop-invariant code is independent to that loop. Moreover, the query results of multiple queries are equivalent with and without applying SQL statement inlining if those queries have flow dependency. Therefore, the result of the procedure is never affected by the hoist motion. Similarly a sinkable statement is also loop-invariant for the sink motion and does not affect the result of the procedure.

Execution Plan Enumeration

This section presents how to enumerate execution plans that result from different combinations of the hoist and sink motions. In the described strategy, for simplicity of the algorithm, one can first derive an initial execution plan that hoists all the hoistable statements in all the loop body blocks. One can then only consider for sinkable statements of the initial execution plan. One can denote the initial execution plan by $IG^0$.

In performing the loop-invariant query motion for optimization, one method exploits a query decomposition technique to increase the loop-invariant statements for each loop. The query decomposition technique divides a table into two tables, modifiable and non-modifiable, and expresses a query by using two tables. Then the queries on non-modifiable tables can be moved out of the loop. In order to increase the opportunity to find hoistable or sinkable statements, we use a similar technique. To further increase the opportunity, one can additionally express each subquery in a query as a table variable. If the expression $e_1$ has a sub-query in the statement $s_1=(v_1, e_1)$, we create a statement $s_2=(v_2, e_2)$ for subquery and substitute the subquery with $v_2$ in $e_1$.

Conditional, branch, and loop statements can be used in the loop. For conditional or branch statement, if SOL is sinkable, sinking SOL to inside the loop does not affect the result of the procedure.

One can note that the hoistable statement s can be moved outside the loop body block to place it into previous or next basic block depending on the data dependency. For loop l and $\exists s \in \acute{S}IL(l)$, s is only moved the previous block of the loop body block if $$\exists \acute{s} \in SIL(l) \text{ s.t. } s \xrightarrow{FD+} \acute{s}.$$

If s does not have any dependencies on SIL(l) and $$s \xrightarrow{FD+} \acute{s},$$

then s is moved the basic block $B_{\acute{s}}$ of $\acute{s}$.

For a nested loop, if SOL is sinkable for multiple loop body blocks, SOL is sinked to the loop body block that has a benefit.

If there is a benefit in sinking in the inner loop, sinking only to the inner loop can in some cases result in incorrect access to the unallocated variable in the outer loop. In this case, we maintain the loop outer syntax and allocate the same syntax to sink into the inner loop. If SOL is only sinked to the inner loop rather than outer loop, this query motion will cause incorrect access to the unallocated variable in the outer loop. In order to avoid this case, we allocate a new SOL then sink to the inner loop.

If the statement is sinkable to n number of sequential loops, we measure the benefit of the sink for each loop and then sink the statement into the loop that has a benefit. However, enumerating and measuring for all possible execution plans are infeasible. In such a case, materializing SOL without sinking rather than executing iteratively for n number of loops is often more beneficial. Therefore, in order to reduce the search space for query motion, if query s is sinkable in multiple loops, it is pruned from the search space of query motion.

FIGS. 17-19 represent alternative execution plans for a procedure with nested loops. FIG. 17 represents an execution plan for the user-written procedure, showing the flow dependencies between statements. As such, this representation can also be created by leveraging a Data Dependency Graph (DDG) to determine dependencies between and among statements that are included in an intermediate representation of an execution plan. DDG creation can be based on multi-pass linear traversal to determine the dependencies between and among statements. In practice, the Data Dependency Graph may only represent direct dependencies, so additional processing can be used to determine indirect dependencies, if any.

FIG. 18 represents an initial execution plan, which can be formulated by performing a hoist operation on all hoistable statements. Suppose, $s_3$ is a loop-invariant statement. For building the initial execution plan, $s_3$ is moved to $B_1$ since $S_3$ is a hoistable statement and $$s_1 \xrightarrow{FD+} s_3.$$

4(c) is an alternative execution plan when $s_3$ and $s_1$ are sinked to $B_3$ from the initial execution plan. $s_0$ is not sinked since $s_0$ has flow data dependencies for $B_3$ and $B_5$.

One can select the statements to sink in consideration of the data dependency graph. We note that if the statement without considering the data dependency is sinked, then some statements can be exposed to access unallocated variables.

Definition 5. (Sink Subgraph)

The sink subgraph is a structure for selecting the queries to sink in consideration of the data dependency graph. Given the initial IR graph $IG^0$, the sink subgraph $SG=N',E')$ is a graph in which a set of nodes N' and a set of edges E' are all subsets of $IG^0$. The statement of the node n∈N' is sinked to the statement of the neighbor node of n in $IG^0$.

Sink subgraphs are enumerated from the data dependency graph DDG. For each invariant statement, we find loop invariant statements in node n∈N for the loop body block. One can then retrieve the node n' for the loop invariant query from DDG and discover for a set of sink subgraphs starting with a set of neighbor nodes $N_{n'}$, of n'. In order to discover all sink subgraphs, one can adopt the pattern growth approach used in frequent subgraph mining One can extend the subgraph by adding one edge at a time in depth first order starting with $N_{n'}$, and enumerating the sink subgraphs.

FIG. 20 represents a sink subgraph SG for Procedure 1. SG is generated based on all sinkable statements of DDG. The sinkable statements $S_2$, $S_3$, $S_4$, $S_5$, $S_6$, $S_7$, and $S_8$ are extracted from SG.

Algorithm LoopOptimization inputs initial execution plan $IG^0$ and returns optimized execution plan $IG^*$. We find all the loop body blocks by using in-order traversal from $B_o$ and build the data dependency graph DDG (lines 1-2). Then for each loop body block l, all sink subgraphs are enumerated. Finally, the algorithm selects the sink subgraph with highest benefit and this sink subgraph is sinked into the loop body block (lines 5-10).

Algorithm DiscoverSinkSubgraphs enumerates all sink subgraphs G for s. The sink subgraphs are enumerated by extending the edges between s and the sinkable statements among the neighbor nodes of s (line 2-9). It recursively enumerates all sink subgraphs until there are no more edges to expand.

FIG. 21 shows the search space tree to discover all sink subgraphs for Procedure 1. The enumeration algorithm starts searching from the node containing statement $S_8$ and then extends one edge to its neighbor node to access a corresponding statement. Similarly, the algorithm traverses from one node to another until it visits a node that has no neighbor.

In a worst case, the only flow data dependencies exists among statements in execution plan. Algorithm 2 takes O (m+n) time that is same as the time complexity of depth first search algorithm from node s on directed acyclic graph in worst case, where m is the number of edges in ancestor nodes. Let j be the number of sinkable statements for all the loops. Algorithm 2 takes O(j*(m+n)) since the algorithm calls AlgorithmDiscoverSinkSubgraphs j times.

---
Algorithm 1: LoopOptimization($IG^0$)
---

Input : An initial execution plan $IG^0$
Output: An optimized execution plan IG*
1  find a set L of loop body blocks by using in-order traversal from $B_0$
2  build a data dependency graph DDG for IG
3  G ← emptyset
4  for each loop body block l in L do
5      for each sinkable statement s in SS(l) do
6          generate a sinkable subgraph sg with s
7          G' ← DiscoverSinkSubgraphs(s,sg,DDG)
8          G ← G∪G'
9      end
10     g = argmax$_{g \in G}$B(g,l)
11     sink all statements in g to inside of l
12 end
13 return IG ---
Algorithm 2: DiscoverSinkSubgraphs(s, sg, DDG)
---

Input : a statement s, a sinkable subgraph sg, a data dependency graph DDG
Output: a set of sink subgraphs G
1  get a set of edges $E_s$ of s from DDG
2  for each e ∈ $E_s$ do
3      if type of e is flow dependency then
4          get s' connected by e
5          generate sg' extending e from sg
6          G ← G∪{sg'}
7          DiscoverSinkSubgraphs(s', sg', DDG)
8      end
9  end Other optimization techniques used in existing programming optimization techniques can improve the performance of our query motion algorithm. Here, we describe some of the optimization techniques.

Flattening a procedure refers to unfold the body of the callee procedure into the body of the caller procedure. One can note that an output table parameter of a procedure can be an input of another SELECT statement. By flattening nested procedure calls, the optimizer can have more chances to apply SQL statement inlining Therefore, if there is a caller statement in SS(l) and HS(l), the call flattening enhances the improvement of the performance for the query motion.

When a variable in the statements has a constant value at the compile time, we substitute the variable with the value. We propagate the substitution so that the variables referring to the substituted variables are subsequently substituted as well. The constant propagation removes unnecessary control flow in the procedure. In addition, the accuracy of the cost model can be increased if the number of loop iterations is determined as a constant value through the constant propagation.

One can also eliminate a statement if we can guarantee that the generated results of that statement will never be used in the script. One can also eliminate an unreachable branch if we determine that the conditions for that branch are evaluated as false after the constant propagation. If there is dead code in SS(l) and HS(l) for loop l, the search space of the query motion algorithm can be reduced.

Computing Execution Resource Demand Estimation

The estimated cost caused by query motion can have great effect on the overall query optimization. The cost of the execution plan for a procedure, referred to herein as the "computing execution resource demand" for the procedure, can be estimated as the sum of the cost of statements in each basic block. For a procedure with a loop l, we estimate the cost of a statement s∈SIL(l) by multiplying the cost of s by the number of loop iterations.

In one example embodiment, our proposed algorithm hoists all hoistable statements in the initial execution plan and then enumerates the sinkable statements for each loop. Therefore, it is not necessary to calculate the cost for all statements in the procedure. We only estimate the cost for statements whose execution plans are changed due to the sink. When s is sinked to l, the execution plans for the statements outside the l and the statements inside the l are changed. Moreover, the inlined statement with s is executed for $K_n$ times since s is sinked to the loop body block. Given a set of sinked statements S and the loop l, we define the total cost Cost(S, l) as the Equation (1):

$$\mathrm{Cost}(S, l) = \sum_{s' \in SOL(l)} \mathrm{Cost}_q(s') + K_n \sum_{s \in SIL(l)} \mathrm{Cost}_q(s) \qquad (1)$$

Where $K_n$ is a number of iteration for the basic block n.

One can calculate the query cost $\mathrm{Cost}_q$ (s) as the sum of the cost of materializing the result of s and the cost of performing the entire subtree on the s execution plan. The optimizer estimates the access-time for the table by considering the query algorithm. For example, in the case of an index join, cost estimation reflects the time to look up the index on the M records in the right table while scanning N records in the left table.

The accuracy of the proposed cost model depends on the accuracy of the estimated cost by the optimizer. Due to the SQL Statement Inlining, the number of relational operators in the analytical query may become very large. Therefore, the prediction of the size of the tuple as a result of the query execution is not accurate and the accuracy of the cost estimated by the optimizer can deteriorate. In this case, random sampling based cost estimation is used. which is a standard technique for building approximate histograms. This is a method for estimating the cost by constructing a dataset by sampling n % blocks randomly and executing the query on this dataset.

Invoking Cost(S, l) for each sinkable subgraph in the query motion algorithm is very expensive since Cost(S,l) drives the query optimizer to compile every query of SOL(l) and SIL(l). In order to reduce the number of optimizer calls, we store compiled execution plan to plan cache and reuse it.

One can note that the number of iterations $K_n$ greatly affects the accuracy of the cost model. If it is possible to calculate $K_n$ from the loop condition at the compile time, the cost can be estimated accurately. However, $K_n$ may not be accurately measured at the compile time if the loop condition uses the result computed from the statements inside the loop or if the branch statement (GOTO, EXIT, CONTINUE) exists inside the loop. Therefore, we use a hybrid approach to trade off between the accuracy and the processing time. By setting a timer, we perform the procedure once for a given set of parameters to measure the number of iterations for all loops. If it finishes before timeout, we use the number counted. Otherwise, we estimate Kn by using the existing loop iteration prediction technique.

The cost B(S,l) for S and l is the difference between the cost of Cost(S,l) and the cost of Cost(∅,l). We note that Cost(∅,l) represents the cost before sinking. Thus, the benefit measurement is defined as the following Equation (2).

$$B(S,l) = \text{Cost}(S,l) - \text{Cost}(\emptyset,l) \qquad 5$$

Experiments

This section describes the experimental results for the evaluation of the proposed optimization algorithm in terms of efficiency. One can describe the experimental setting below. The objectives of the experiments are four-fold. First, one can show that the performance of the proposed algorithm is superior compared to other algorithms, such as "sink-motion-only" (SM) and "hoist-motion-only" (HM) algorithms. Second, one can show that the performance of our proposed algorithm is affected by the physical properties such as indexing. Third, one can show that the execution and compilation time of the proposed algorithm is affected by the scenarios of query motion and the data sizes. Finally, one can show the error ratio of the cost model based on the query estimation that proves the feasibility of the proposed algorithm.

Experimental Setting

The experiments were conducted in a system having 512 GB RAM and an Intel Xeon 2.4 GHz processor. The operating system is the Suse Linux 11. To evaluate the performance of the proposed algorithm, we used the SQLScript of SAP HANA. The cost estimation for each configuration was measured by applying the SQL HANA optimizer.

Since there is no benchmark found for the iterative analytical queries, we have extended the query in the TPC-DS benchmark, which is incorporated herein by reference, and may be found at http://www.tpc.org/tpcds/. We generated four procedures considering both single loop and nested loop cases. In order to create the procedures with loops, we selected four representative queries from the TPC-DS benchmark—queries 23, 34, 49, 78—and expanded them in a loop form by translating such queries recursively according to the given parameters. We denote these four procedures as $P_1$, $P_2$, $P_3$, $P_4$. We consider two real-world application scenarios such as customer analysis and trend analysis. $P_1$ discovers the best customer based on the frequent items over several periods. $P_2$, $P_3$, and $P_4$ analyze the trend of various dimensions such as purchasing items, worst return ratios, and the ratio of channel scales, respectively. We extended this query to recursively compute over several periods.

For example, one of the scenarios is a procedure that is extended to have a loop in the query23.tpl query. This procedure reports after searching for the excellent customers within the top 5% of purchasing history grades. It outputs periodic results of purchasing frequent items as excellent customers. We extended this query to iteratively compute over three years.

We created three databases with different sizes such as 10 GB, 50 GB, 100 GB. We observed the scalability of the proposed algorithm using these different size of databases. Moreover, we show that the performance of the algorithm varies according to the table statistics even for the same procedure.

Existing techniques can extract the imperative procedure codes to the equivalent declarative SQL, but cannot be adopted to the procedures since some statements inside the loop are not idempotent. We implemented the existing loop-invariant code motion method to evaluate and compare the performance with our proposed optimization algorithm. We considered the following four algorithms to compare the performances:

Hoist based query motion (HM): This algorithm is derived from the loop code invariant code motion. For all loops, all hoistable statements are hoisted to outside the loop.

Sink based query motion (SM): This algorithm is derived from Algorithm 2. For all loops, all sinkable statement extracted from sinkable subgraphs are sinked to inside the loop.

Estimated cost based query motion (CM): The query plan enumeration algorithm is the one proposed in the section above, entitled "EXECUTION PLAN ENUMERATION". We use the cost model proposed in the section above, entitled "COMPUTUNG EXECUTION RESOURCE DATA DEMAND ESTIMATION".

Exact cost based query motion (ECM): The query plan enumeration algorithm is the same as CM. In order to choose the best execution plan with exact benefit, we enumerate the benefit of an execution plan through the query execution. We use ECM to show the best performance of our proposed algorithm using the exact query execution cost.

We conducted the experiments to evaluate the performance of the query motion algorithms on the following parameters: the various procedures, scale of databases, and indexes.

Experiment A: This experiment was designed to compare the execution times of various databases and procedures. We show the scalability of the proposed algorithm.

Experiment B: This experiment shows the performance impact of the proposed algorithm according to whether or not the indexes for Procedures 2 and 4.

Experiment C: This experiment was designed to show the compilation time of the proposed algorithm according to various databases and procedures.

Experiment D: This experiment shows the error ratio of the proposed cost model for all procedures.

Experimental Result

Experiment A

Figure 24:
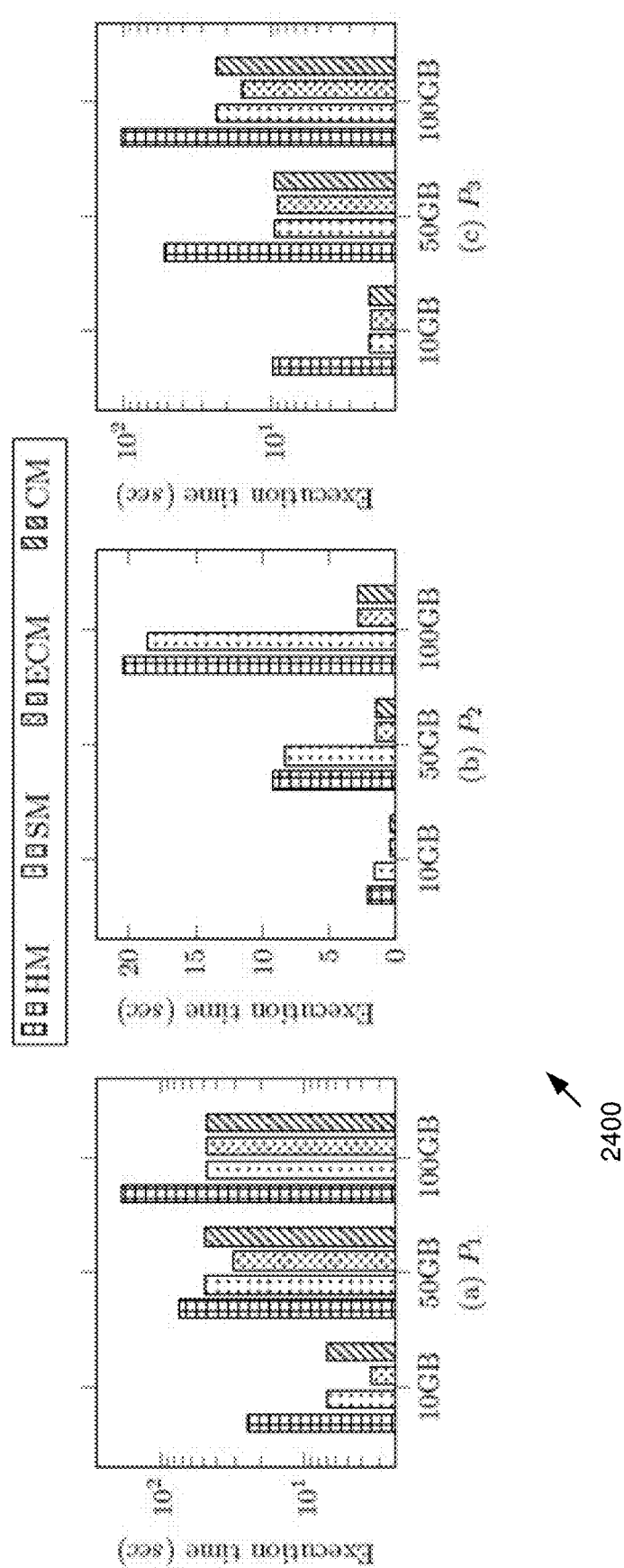
FIG. 24 is a set of charts illustrating execution times from a first experiment evaluating different example methods of procedure execution plan optimization.

In this experiment, we observed the execution time for different procedures and the different databases. We compared the execution times for three databases 10 GB, 50 GB, 100 GB and three procedures $P_1$, $P_2$, $P_3$. The experimental results are plotted in the series of tables 2400 in FIG. 24. FIG. 24 shows that the proposed method (CM) performed best compared with HM and SM.

In $P_1$ for all databases, SM has faster execution time than HM. The CM chooses the execution plan with all sinkable statements as the best plan. In the 10 GB and 50 GB databases, the CM does not choose the best execution plan due to the error in the query cost estimation for the sinkable statement.

In $P_2$, $P_3$ for all databases, CM has the faster execution time than HM and SM. Especially, in $P_2$ and 100 GB databases, CM shows over 6 times faster execution time than SM. We observed that CM removes the redundant loop-invariant query execution by hoisting. CM also detects the beneficial sinkable statement that arises selective predicates are pushed down to statement inside the loop through SQL Statement Inlining.

Experiment B

Figure 25:
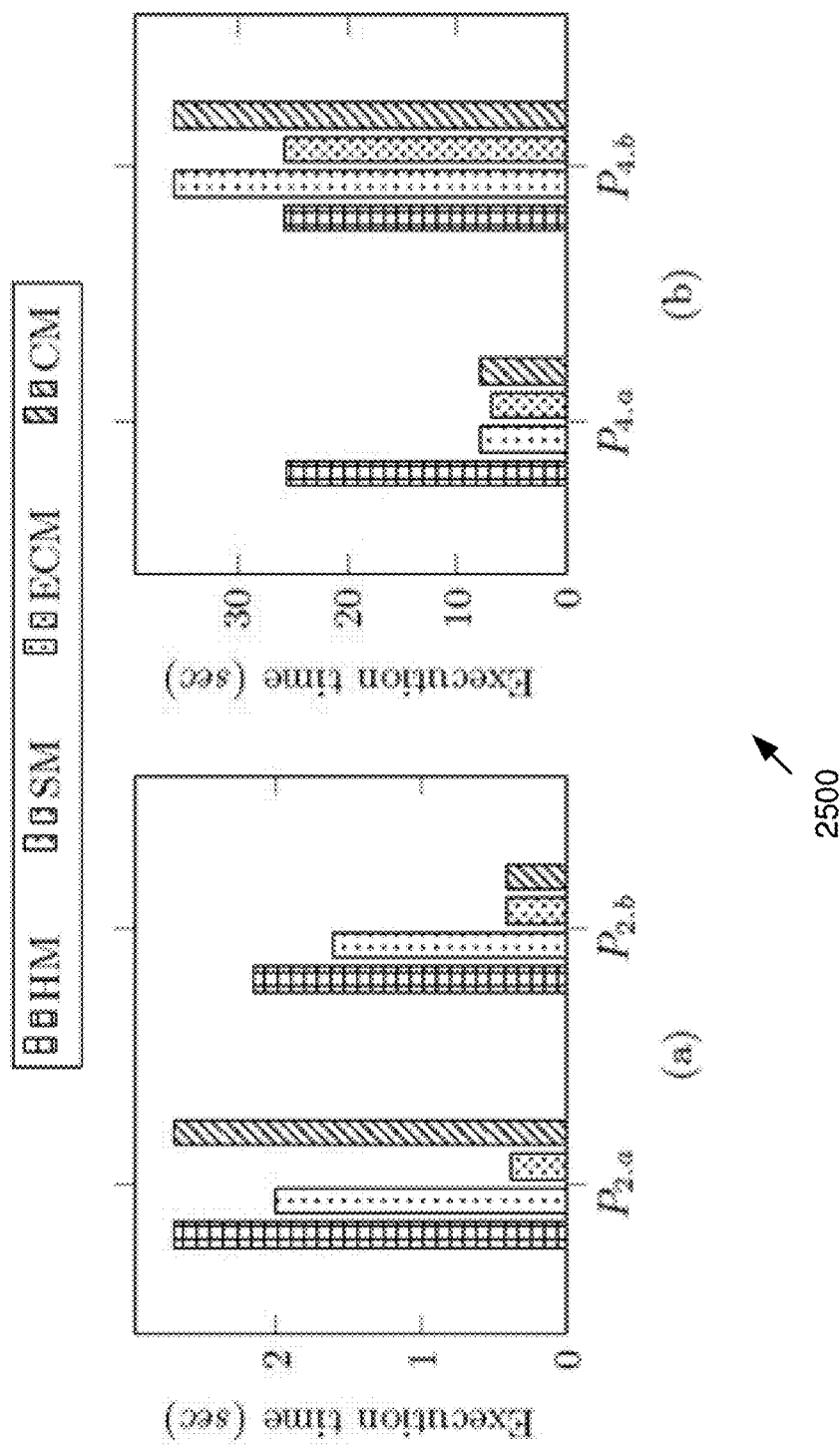
FIG. 25 is a set of charts illustrating execution times from a second experiment evaluating different example methods of procedure execution plan optimization.

In this experiment, we compare execution time for the procedures $P_2$ and $P_4$ based on the indexes. We build the indexes on both the primary key for all tables and used the filter columns in the statements inside all loops. We compared the execution times for 10 GB database. We call databases with indexes as $P_{2.a}$ and $P_{4.a}$. Otherwise, we call databases with no indexes as $P_{2.b}$ and $P_{4.b}$. We plotted the experimental results in the tables 2500 shown in FIG. 25. FIG. 25 shows that SM is always faster than HM in case of $P_2$. However, CM and SM shows over 3 times faster execution time than HM in case of $P_{4.a}$. In contrast, the execution time for HM is improved by 30% in case of $P_{4.b}$. We observed that sinking and inlining statements help the query optimizer to enumerate more efficient join operators with the hash join operator using indexes. We also observed that even with the same procedure, the execution plan with the highest benefit is affected by the availability of indexes. We note that the cost model of CM cannot estimate the benefit accurately in case of $P_{2.a}$ and $P_{2.b}$. Therefore, CM cannot select the best execution plan for only those two cases.

Experiment C

Figure 26:
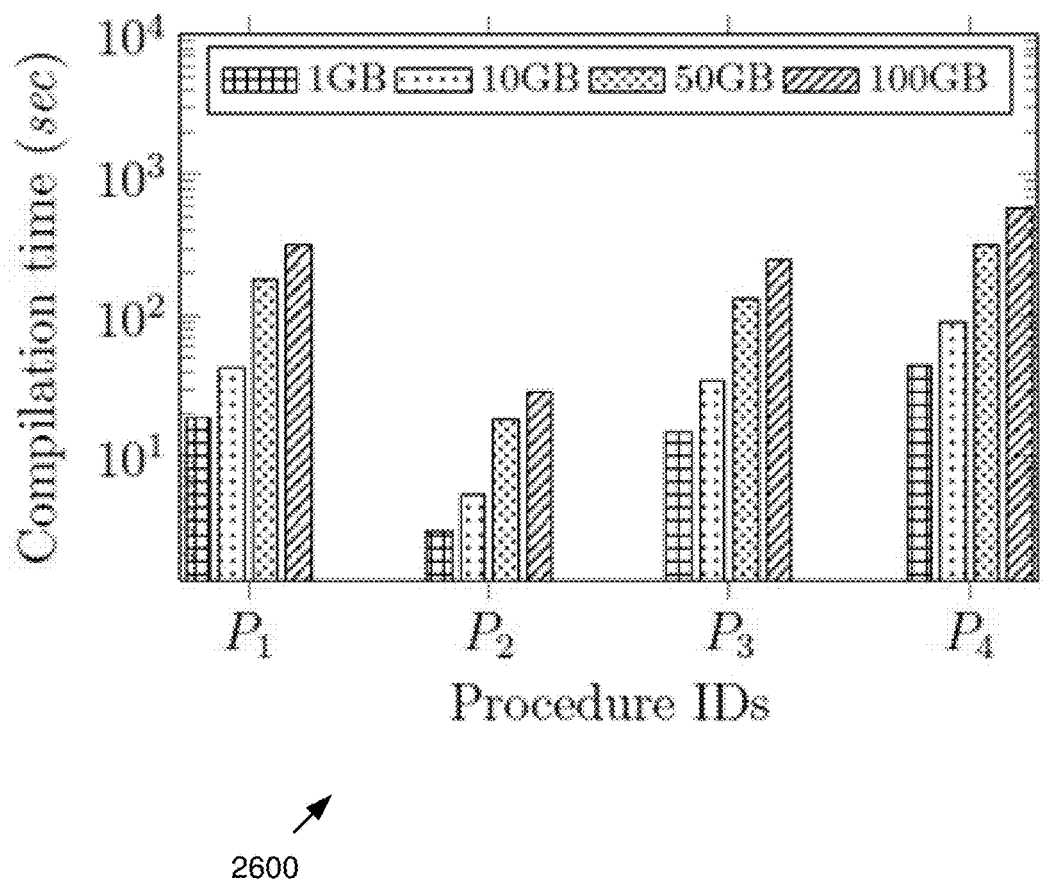
FIG. 26 is a chart illustrating compilation times from several experiments performed using example methods of procedure execution plan optimization.

In this experiment, we evaluated the entire compilation time for different procedures. We applied different rules on the procedure such as constant propagation, control flow simplification, and SQL statement inlining. Then we evaluated the compilation time for the procedure for each applied rules and compared with the compilation time of our proposed algorithm. The evaluated results are plotted in FIG. 26. FIG. 26 includes tables 2600 showing execution times for various procedures performed on different sixed databases. All optimization techniques except our proposed algorithm take less than 1 second, which can be considered as insignificant. We observed that the cost estimation occupies a significant portion of the overall compilation time. As the size of database increases, the cost estimation also increases due to the sampling based query cost estimation. However, we note that the compilation process is a one-time activity and therefore is usually considered as a trivial issue.

Experiment D

In this experiment, we evaluated the quality of our cost model (CM) by comparing with an exact cost model (ECM). The exact cost model enumerates the actual execution cost by executing the query. However, the proposed cost model estimates the execution cost by using the query optimizer. The error ratio was calculated by using the root mean square error (RMSE).

Table 2 represents the error ratio for the datasets of 10 GB and 100 GB. The table shows that the error ratio for the proposed CM is less than 0.05 for both datasets. We note that the error ratio obtained for our proposed CM is acceptable and significantly lower than the error ratio obtained for other techniques.

TABLE 2

| Comparison of error ratio | | |
|---|---|---|
| Algorithm | 10 GB | 100 GB |
| HM | 3.92 | 73.2 |
| SM | 0.57 | 8.29 |
| CM | 0.01 | 0.04 |

Example 38—Example Computing Systems

Figure 27:
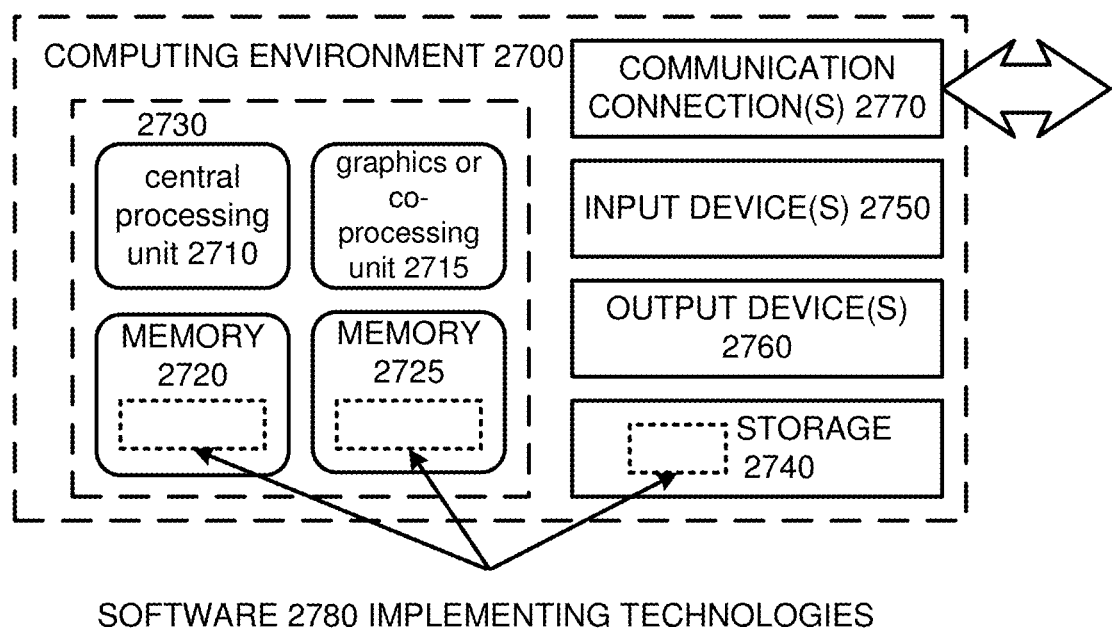
FIG. 27 is a diagram of an example computing system in which some described embodiments can be implemented.

FIG. 27 depicts a generalized example of a suitable computing system 2700 in which the described innovations can be implemented. The computing system 2700 is not intended to suggest any limitation as to scope of use or functionality of the present disclosure, as the innovations can be implemented in diverse general-purpose or special-purpose computing systems.

With reference to FIG. 27, the computing system 2700 includes one or more processing units 2710, 2715 and memory 2720, 2725. In FIG. 27, this basic configuration 2730 is included within a dashed line. The processing units 2710, 2715 execute computer-executable instructions, such as for implementing the features described in the above examples. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 27 shows a central processing unit 2710 as well as a graphics processing unit or co-processing unit 2715. The tangible memory 2720, 2725 can be volatile memory (e.g., registers, cache, RAM), non-volatile memory (e.g., ROM, EEPROM, flash memory, etc.), or some combination of the two, accessible by the processing unit(s) 2710, 2715. The memory 2720, 2725 stores software 2780 implementing one or more innovations described herein, in the form of computer-executable instructions suitable for execution by the processing unit(s) 2710, 2715.

A computing system 2700 can have additional features. For example, the computing system 2700 includes storage 2740, one or more input devices 2750, one or more output devices 2760, and one or more communication connections 2770, including input devices, output devices, and communication connections for interacting with a user. An interconnection mechanism (not shown) such as a bus, controller, or network interconnects the components of the computing system 2700. Typically, operating system software (not shown) provides an operating environment for other software executing in the computing system 2700, and coordinates activities of the components of the computing system 2700.

The tangible storage 2740 can be removable or non-removable, and includes magnetic disks, magnetic tapes or cassettes, CD-ROMs, DVDs, or any other medium which can be used to store information in a non-transitory way and which can be accessed within the computing system 2700. The storage 2740 stores instructions for the software 2780 implementing one or more innovations described herein.

The input device(s) 2750 can be a touch input device such as a keyboard, mouse, pen, or trackball, a voice input device, a scanning device, or another device that provides input to the computing system 2700. The output device(s) 2760 can be a display, printer, speaker, CD-writer, or another device that provides output from the computing system 2700.

The communication connection(s) 2770 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules or components include routines, programs, libraries, objects, classes, components, data structures, etc. that perform particular tasks or implement particular abstract data types. The functionality of the program modules can be combined or split between program modules as desired in various embodiments. Computer-executable instructions for program modules can be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

In various examples described herein, a module (e.g., component or engine) can be "coded" to perform certain operations or provide certain functionality, indicating that computer-executable instructions for the module can be executed to perform such operations, cause such operations to be performed, or to otherwise provide such functionality. Although functionality described with respect to a software component, module, or engine can be carried out as a discrete software unit (e.g., program, function, class method), it need not be implemented as a discrete unit. That is, the functionality can be incorporated into a larger or more general purpose program, such as one or more lines of code in a larger or general purpose program.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 39—Example Cloud Computing Environment

Figure 28:
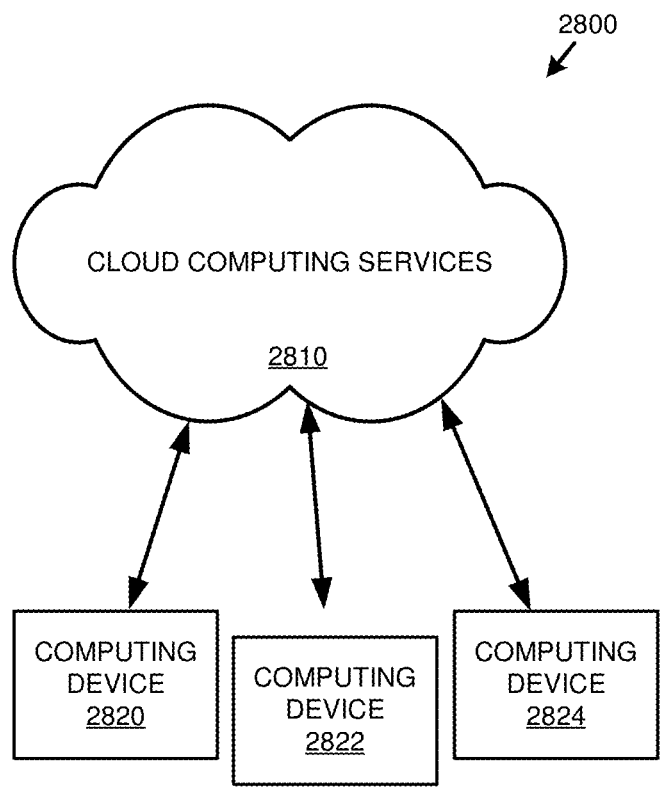
FIG. 28 is a diagram of an example cloud computing environment that can be used in conjunction with the technologies described herein.

FIG. 28 depicts an example cloud computing environment 2800 in which the described technologies can be implemented, including, e.g., the environment 100 of FIG. 1. The cloud computing environment 2800 comprises cloud computing services 2810. The cloud computing services 2810 can comprise various types of cloud computing resources, such as computer servers, data storage repositories, networking resources, etc. The cloud computing services 2810 can be centrally located (e.g., provided by a data center of a business or organization) or distributed (e.g., provided by various computing resources located at different locations, such as different data centers and/or located in different cities or countries).

The cloud computing services 2810 are utilized by various types of computing devices (e.g., client computing devices), such as computing devices 2820, 2822, and 2824. For example, the computing devices (e.g., 2820, 2822, and 2824) can be computers (e.g., desktop or laptop computers), mobile devices (e.g., tablet computers or smart phones), or other types of computing devices. For example, the computing devices (e.g., 2820, 2822, and 2824) can utilize the cloud computing services 2810 to perform computing operations (e.g., data processing, data storage, and the like).

Example 40—Example Implementations

Although the operations of some of the disclosed methods are described in a particular, sequential order for convenient presentation, it should be understood that this manner of description encompasses rearrangement, unless a particular ordering is required by specific language set forth herein. For example, operations described sequentially can in some cases be rearranged or performed concurrently. Moreover, for the sake of simplicity, the attached figures can not show the various ways in which the disclosed methods can be used in conjunction with other methods.

Any of the disclosed methods can be implemented as computer-executable instructions or a computer program product stored on one or more computer-readable storage media and executed on a computing device (e.g., any available computing device, including smart phones or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example and with reference to FIG. 27, computer-readable storage media include memory 2720 and 2725, and storage 2740. The term computer-readable storage media does not include signals and carrier waves. In addition, the term computer-readable storage media does not include communication connections (e.g., 2770).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network, or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Python, Ruby, ABAP, SQL, Adobe Flash, or any other suitable programming language, or, in some examples, markup languages such as html or XML, or combinations of suitable programming languages and markup languages. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

Example 41—Further Example Implementations

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

Example 42—Example Alternatives

The technologies from any example can be combined with the technologies described in any one or more of the other examples. In view of the many possible embodiments to which the principles of the disclosed technology can be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A computer-implemented method comprising:
    receiving an intermediate representation of an input procedure comprising a plurality of statements, wherein the plurality of statements comprises a plurality of query statements, and a plurality of imperative statements comprising a loop;
    enumerating a plurality of query execution plan candidates for the input procedure via the intermediate representation of the input procedure, wherein the enumerating comprises:
        considering a plurality of query statements as sink operation candidates for a loop;
        performing at least one sink operation on a query statement, wherein the at least one sink operation moves the query statement inside a loop boundary; and
        excluding a sink operation from consideration based on a data dependency between at least two statements identified in a data dependency graph;
    performing query inlining that combines at least two query statements;
    estimating computing execution resource demands for respective of the plurality of query execution plan candidates; and
    determining an optimal query execution plan for the input procedure, wherein the determining comprises finding a candidate query execution plan having a lowest estimated computing execution resource demand.

2. The computer-implemented method according to claim 1, wherein the enumerating comprises:
    moving a query statement in the intermediate representation into a different loop or moving a query statement in the intermediate representation into a loop already having another query statement;
    whereby the optimal query execution plan integrates query motion across iterative constructs.

3. The computer-implemented method according to claim 1, further comprising:
    performing at least one hoist operation on a query statement, thereby moving the query statement outside a loop boundary.

4. The computer-implemented method according to claim 1, wherein the enumerating comprises:
    generating an initial query execution plan candidate, wherein the generating comprises performing hoist operations on a plurality of query statements appearing in the intermediate representation.

5. The computer-implemented method according to claim 4, wherein the enumerating comprises:
    generating a plurality of alternative query execution plan candidates, wherein the generating comprises performing various different permutations of sink operations on the initial query execution plan candidate for different of the plurality of alternative query execution plan candidates.

6. The computer-implemented method according to claim 1, wherein performing query inlining that combines at least two query statements comprises:
    performing query inlining on the at least one sinked query statement.

7. The computer-implemented method according to claim 6, wherein:
    the query inlining relatively improves performance of the input procedure.

8. The computer-implemented method according to claim 1, wherein enumeration comprises:
    building a sink subgraph for the loop from a data dependency graph representing at least one data dependency relationship for the plurality of statements, wherein the sink subgraph represents sink dependencies between a plurality of statements in the loop.

9. The computer-implemented method according to claim 8, wherein the enumeration comprises:
    enumerating another sink subgraph representing sink dependencies between a plurality of statements in another loop.

10. The computer-implemented method according to claim 1, wherein enumerating the plurality of query execution plan candidates comprises generating a plurality of alternative execution plans reflecting a plurality of sink operations for different query statements of the input procedure.

11. The computer-implemented method according to claim 1, wherein the query inlining comprises inlining a statement sinked within the loop boundary for one of the plurality of query execution plan candidates.

12. The computer-implemented method according to claim 11, wherein the query inlining comprises, for a SELECT statement that is used by only one other of the plurality of statements, inlining the SELECT statement to its using statement.

13. The computer-implemented method according to claim 12, wherein the query inlining comprises:

identifying a plurality of SELECT statements that are used by only one other of the plurality of statements; and inlining each of the plurality of identified SELECT statements that are used by only one other of the plurality of statements to its using statement.

14. The computer-implemented method according to claim 1, further comprising:
compiling and executing the input procedure according to the optimal execution plan.

15. The computer-implemented method according to claim 1, wherein the estimating computing execution resource demands for respective of the plurality of query execution plan candidates comprises performing a random sampling based execution resource demand estimation, the performing comprising:
constructing a dataset by sampling n % blocks randomly and
executing the input procedure on this dataset.

16. A computing system comprising:
one or more memories;
one or more processing units coupled to the one or more memories; and
one or more non-transitory computer readable storage media storing instructions that, when executed, cause the one or more processing units to perform the following operations:
receiving an intermediate representation of an input procedure comprising a plurality of statements, wherein the plurality of statements comprises a plurality of query statements, and a plurality of imperative statements comprising a loop;
enumerating a plurality of query execution plan candidates for the input procedure via the intermediate representation of the input procedure, wherein the enumerating comprises:
performing at least one sink operation on a query statement, wherein the at least one sink operation moves the query statement inside a loop boundary;
identifying a SELECT statement within the loop boundary that does not have any dependency to any other statement within the loop boundary; and
based on the identifying, hoisting the SELECT statement;
performing query inlining that combines at least two query statements;
estimating computing execution resource demands for respective of the query execution plan candidates; and
determining an optimal query execution plan for the input procedure, wherein the determining comprises finding a candidate query execution plan having a lowest estimated computing execution resource demand.

17. The computing system according to claim 16, wherein:
finding a candidate query execution plan having a lowest estimated computing execution resource demand comprises determining the system resources utilized by statements in the loop and multiplying by a number of times the loop is iterated; and
determining the system resources utilized by each statement in the loop comprises, for at least one such statement, determining the access-time for any tables accessed by the statement.

18. The computing system according to claim 16, wherein estimating computing execution resource demands for respective of the query execution plan candidates comprises performing a random sampling based execution resource demand estimation, the performing comprising:
constructing a dataset by sampling n % blocks randomly and
executing the input procedure on this dataset.

19. One or more non-transitory computer-readable storage media storing computer-executable instructions that, when executed by a computing system, cause the computing system to perform a method comprising:
receiving an intermediate representation graph depicting a computer-implemented procedure comprising a plurality of statements, wherein at least one of the plurality of statements has data dependency on another statement among the plurality of statements, and wherein the computer-implemented procedure further comprises a loop;
identifying a first statement among the plurality of statements that is within a boundary of the loop that can be moved outside of the loop boundary;
hoisting the first statement outside of the loop boundary;
generating an initial query execution plan reflecting the hoisting;
considering among the plurality of statements a plurality of statements that is outside the loop boundary as sink operation candidates for the loop;
based on at least one data dependency relationship identified in a data dependency graph for the plurality of statements that includes the plurality of statements that is outside the loop boundary, excluding at least one of the sink operation candidates from consideration;
identifying a second statement among the plurality of statements that is outside the loop boundary that can be moved inside the loop boundary;
sinking the second statement inside the loop boundary;
generating an alternative query execution plan reflecting the sinking;
inlining at least one query statement into another query statement, wherein one of the inlined query statements is the second statement on which the sink operation was performed;
estimating computing execution resource demand of the initial query execution plan and the alternative execution plan;
determining an optimal query execution plan based on estimated computing execution resource demand, wherein the determining comprises comparing estimated computing execution resource demand of the initial query execution plan and estimated computing execution resource demand of the alternative execution plan; and
selecting the optimal query execution plan for execution.

20. The one or more non-transitory computer-readable storage media storing computer-executable instructions according to claim 19, wherein estimating computing execution resource demand of the initial query execution plan and the alternative execution plan comprises performing a random sampling based execution resource demand estimation, the performing comprising:
constructing a dataset by sampling n % blocks randomly and
executing the computer-implemented procedure on this dataset.

* * * * *